(12) United States Patent
Abotabl et al.

(10) Patent No.: US 12,495,378 B2
(45) Date of Patent: *Dec. 9, 2025

(54) TECHNIQUES FOR NETWORK ENERGY SAVING SEQUENCES AND CELL INTERACTION

(71) Applicant: QUALCOMM Incorporated, San Diego, CA (US)

(72) Inventors: Ahmed Attia Abotabl, San Diego, CA (US); Hung Dinh Ly, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 17/845,462

(22) Filed: Jun. 21, 2022

(65) Prior Publication Data
US 2023/0413209 A1    Dec. 21, 2023

(51) Int. Cl.
*H04W 52/02* (2009.01)
*H04W 24/08* (2009.01)
*H04W 24/10* (2009.01)
*H04W 56/00* (2009.01)

(52) U.S. Cl.
CPC ....... *H04W 56/0065* (2013.01); *H04W 24/08* (2013.01); *H04W 24/10* (2013.01)

(58) Field of Classification Search
CPC ..... H04L 5/001; H04L 5/0048; H04L 5/0053; H04L 5/0058; H04L 5/0094; H04W 24/08; H04W 24/10; H04W 56/0065
See application file for complete search history.

(56) References Cited

U.S. PATENT DOCUMENTS

| | | | |
|---|---|---|---|
| 11,825,413 B2 * | 11/2023 | Cui | H04W 76/28 |
| 11,924,765 B2 * | 3/2024 | Marinier | H04W 72/23 |
| 12,069,571 B2 * | 8/2024 | Sun | H04W 76/28 |
| 2021/0153209 A1 | 5/2021 | Guan et al. | |
| 2021/0160703 A1 | 5/2021 | Luo et al. | |
| 2022/0159574 A1 * | 5/2022 | Islam | H04W 52/0219 |
| 2024/0049002 A1 * | 2/2024 | Abotabl | H04W 72/23 |
| 2024/0073800 A1 * | 2/2024 | Abotabl | H04W 72/23 |

OTHER PUBLICATIONS

International Search Report and Written Opinion—PCT/US2023/067322—ISA/EPO—Sep. 12, 2023.

* cited by examiner

*Primary Examiner* — Phuc H Tran
(74) *Attorney, Agent, or Firm* — Holland & Hart LLP

(57) ABSTRACT

Methods, systems, and devices for wireless communications are described. A user equipment (UE) may receive first control signaling indicating a first network operation sequence associated with a first component carrier, the first network operation sequence including a first set of time intervals corresponding to a first set of network operation modes for the first component carrier. The UE may additionally receive second control signaling indicating a second network operation sequence associated with a second component carrier, the second network operation sequence including a second set of time intervals corresponding to a second set of network operation modes for the second component carrier. The UE may then communicate via the first component carrier in accordance with the first network operation sequence, and communicate via the second component carrier in accordance with the second network operation sequence.

34 Claims, 17 Drawing Sheets

TECHNIQUES FOR NETWORK ENERGY SAVING SEQUENCES AND CELL INTERACTION

FIELD OF TECHNOLOGY

The following relates to wireless communications, including techniques for network energy saving sequences and cell interaction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Network entities, such as base stations, consume large amounts of power, especially in 5G wireless communications systems. As such, there is a need to reduce network power consumption, while still managing traffic loads within the network.

SUMMARY

The described techniques relate to improved methods, systems, devices, and apparatuses that support techniques for network energy saving sequences and cell interaction. Generally, aspects of the present disclosure support cell-specific (e.g., component carrier-specific) network operation sequences that include multiple network operation modes, where the respective network operation modes are associated with varying levels of power consumption, data rates, types of supported communications, etc. In particular, aspects of the present disclosure may enable a network entity (e.g., base station) to configure multiple network operation sequences on a cell-by-cell (e.g., component carrier-by-component carrier) basis. For example, a first component carrier (e.g., first cell) supported by a network entity may be associated with a first network operation sequence, and second component carrier (e.g., second cell) supported by the network entity may be associated with a second network operation sequence that is different from the first network operation sequence. The use of separate network operation sequences may enable some component carriers to operate in lower-power consumption modes, while simultaneously enabling the network to accommodate network traffic.

A method is described. The method may include receiving first control signaling indicating a first network operation sequence associated with a first component carrier, the first network operation sequence including a first set of time intervals corresponding to a first set of network operation modes for the first component carrier, receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, communicating via the first component carrier in accordance with the first network operation sequence, and communicating via the second component carrier in accordance with the second network operation sequence.

An apparatus is described. The apparatus may include a processor, memory coupled with the processor, and instructions stored in the memory. The instructions may be executable by the processor to cause the apparatus to receive first control signaling indicating a first network operation sequence associated with a first component carrier, the first network operation sequence including a first set of time intervals corresponding to a first set of network operation modes for the first component carrier, receive second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, communicate via the first component carrier in accordance with the first network operation sequence, and communicate via the second component carrier in accordance with the second network operation sequence.

Another apparatus is described. The apparatus may include means for receiving first control signaling indicating a first network operation sequence associated with a first component carrier, the first network operation sequence including a first set of time intervals corresponding to a first set of network operation modes for the first component carrier, means for receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, means for communicating via the first component carrier in accordance with the first network operation sequence, and means for communicating via the second component carrier in accordance with the second network operation sequence.

A non-transitory computer-readable medium storing code is described. The code may include instructions executable by a processor to receive first control signaling indicating a first network operation sequence associated with a first component carrier, the first network operation sequence including a first set of time intervals corresponding to a first set of network operation modes for the first component carrier, receive second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, communicate via the first component carrier in accordance with the first network operation sequence, and communicate via the second component carrier in accordance with the second network operation sequence.

Some examples of the method, apparatuses, and non-transitory computer-readable medium described herein may further include operations, features, means, or instructions for receiving one or more synchronization signal block (SSB) messages via the first component carrier in accordance with the first network operation sequence.

Some examples of the method, apparatuses, and non-transitory computer-readable medium described herein may further include operations, features, means, or instructions for receiving, via the first control signaling, an indication of a set of multiple network operation sequences associated with the first component carrier, the set of multiple network operation sequences including the first network operation sequence and a third network operation sequence, the third network operation sequence including a third set of time intervals corresponding to a third set of network operation modes for the first component carrier and selecting the first network operation sequence from the set of multiple network operation sequences based on one or more parameters, a control message, or both, where communicating via the first component carrier in accordance with the first network operation sequence may be based on the selecting.

Some examples of the method, apparatuses, and non-transitory computer-readable medium described herein may further include operations, features, means, or instructions for receiving a set of multiple network operation sequences associated with a set of multiple component carriers, the set of multiple network operation sequences including the first network operation sequence and the second network operation sequence, where the set of multiple network operation sequences include at least a threshold quantity of network operation sequences that may be associated with a latency that satisfies a latency threshold, a data rate that satisfies a data rate threshold, or both.

Some examples of the method, apparatuses, and non-transitory computer-readable medium described herein may further include operations, features, means, or instructions for receiving an indication of the threshold quantity of network operation sequences.

In some examples of the method, apparatuses, and non-transitory computer-readable medium described herein, where the first network operation sequence may be associated with a first latency and a first data rate, where the first latency, the first data rate, or both, may be determined based on a first identifier associated with the first network operation sequence, the first set of network operation modes, or both and where the second network operation sequence may be associated with a second latency and a second data rate, where the second latency, the second data rate, or both, may be determined based on a second identifier associated with the second network operation sequence, the second set of network operation modes, or both.

Some examples of the method, apparatuses, and non-transitory computer-readable medium described herein may further include operations, features, means, or instructions for receiving, via the first control signaling, the second control signaling, or both, an indication of a first latency, a first data rate, or both, associated with the first network operation sequence, and an indication of a second latency, a second data rate, or both, associated with the second network operation sequence.

Some examples of the method, apparatuses, and non-transitory computer-readable medium described herein may further include operations, features, means, or instructions for receiving, via the first control signaling, the second control signaling, or both, an indication of a first peak data rate associated with the first network operation sequence, and a second peak data rate associated with the second network operation sequence.

Some examples of the method, apparatuses, and non-transitory computer-readable medium described herein may further include operations, features, means, or instructions for determining a time duration during which neither of the first network operation sequence or the second network operation sequence exhibits a data rate that satisfies a threshold data rate and determining, based on determining the time duration, a modified version of the second network operation sequence that exhibits an additional data rate throughout the time duration, where the additional data rate satisfies the threshold data rate, where communicating via the second component carrier includes communicating during the time duration in accordance with the modified version of the second network operation sequence.

Some examples of the method, apparatuses, and non-transitory computer-readable medium described herein may further include operations, features, means, or instructions for determining a time duration during which neither of the first network operation sequence or the second network operation sequence exhibits a data rate that satisfies a threshold data rate and during which both the first network operation sequence and the second network operation sequence may be associated with a power saving mode of the first and second sets of network operation modes and determining, based on determining the time duration, a modified version of the second network operation sequence, where the modified version of the second network operation sequence includes an inactive network operation mode throughout the time duration.

Some examples of the method, apparatuses, and non-transitory computer-readable medium described herein may further include operations, features, means, or instructions for comparing a first network operation mode of the first set of network operation modes and a second network operation mode of the second set of network operation modes based on the first network operation mode and the second network operation mode at least partially overlapping in a time domain and determining a modified version of the first network operation mode, the second network operation mode, or both, based on the comparison and in accordance with a network sequence configuration, the network sequence configuration defining one or more conditions, one or more restrictions, or both, associated with network operation modes across the first component carrier and the second component carrier.

Some examples of the method, apparatuses, and non-transitory computer-readable medium described herein may further include operations, features, means, or instructions for receiving an indication of the network sequence configuration via the first control signaling, the second control signaling, additional control signaling, or any combination thereof, where comparing the first network operation mode and the second network operation mode, determining the modified version, or both, may be based on receiving the network sequence configuration.

In some examples of the method, apparatuses, and non-transitory computer-readable medium described herein, the first component carrier may be associated with a primary cell (PCell) and the second component carrier may be associated with a secondary cell (SCell).

In some examples of the method, apparatuses, and non-transitory computer-readable medium described herein, the first network operation sequence may be associated with a first set of parameters, the second network operation sequence may be associated with a second set of parameters different from the first set of parameters, and the first set of parameters, the second set of parameters, or both, include a network energy consumption level, a maximum data rate, or both.

In some examples of the method, apparatuses, and non-transitory computer-readable medium described herein, the first control signaling may be the same as the second control signaling.

In some examples of the method, apparatuses, and non-transitory computer-readable medium described herein, the first set of network operation modes, the second set of network operation modes, or both, include a first network energy saving mode, a second network energy saving mode, a flexible mode, a legacy mode, an inactive mode, or any combination thereof.

A method for wireless communication at a network entity is described. The method may include transmitting, to a user equipment (UE), first control signaling indicating a first network operation sequence associated with a first component carrier, the first network operation sequence including a first set of time intervals corresponding to a first set of network operation modes for the first component carrier, transmitting, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, communicating with the UE via the first component carrier in accordance with the first network operation sequence, and communicating with the UE via the second component carrier in accordance with the second network operation sequence.

An apparatus for wireless communication at a network entity is described. The apparatus may include a processor, memory coupled with the processor, and instructions stored in the memory. The instructions may be executable by the processor to cause the apparatus to transmit, to a UE, first control signaling indicating a first network operation sequence associated with a first component carrier, the first network operation sequence including a first set of time intervals corresponding to a first set of network operation modes for the first component carrier, transmit, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, communicate with the UE via the first component carrier in accordance with the first network operation sequence, and communicate with the UE via the second component carrier in accordance with the second network operation sequence.

Another apparatus for wireless communication at a network entity is described. The apparatus may include means for transmitting, to a UE, first control signaling indicating a first network operation sequence associated with a first component carrier, the first network operation sequence including a first set of time intervals corresponding to a first set of network operation modes for the first component carrier, means for transmitting, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, means for communicating with the UE via the first component carrier in accordance with the first network operation sequence, and means for communicating with the UE via the second component carrier in accordance with the second network operation sequence.

A non-transitory computer-readable medium storing code for wireless communication at a network entity is described. The code may include instructions executable by a processor to transmit, to a UE, first control signaling indicating a first network operation sequence associated with a first component carrier, the first network operation sequence including a first set of time intervals corresponding to a first set of network operation modes for the first component carrier, transmit, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, communicate with the UE via the first component carrier in accordance with the first network operation sequence, and communicate with the UE via the second component carrier in accordance with the second network operation sequence.

In some examples of the method, apparatuses, and non-transitory computer-readable medium described herein, the first network operation sequence may be configured for communicating SSB messages and the method, apparatuses, and non-transitory computer-readable medium may include further operations, features, means, or instructions for transmitting one or more SSB messages to the UE via the first component carrier in accordance with the first network operation sequence.

Some examples of the method, apparatuses, and non-transitory computer-readable medium described herein may further include operations, features, means, or instructions for transmitting, via the first control signaling, an indication of a set of multiple network operation sequences associated with the first component carrier, the set of multiple network operation sequences including the first network operation sequence and a third network operation sequence, the third network operation sequence including a third set of time intervals corresponding to a third set of network operation modes for the first component carrier and selecting the first network operation sequence from the set of multiple network operation sequences based on one or more parameters, a control message, or both, where communicating with the UE via the first component carrier in accordance with the first network operation sequence may be based on the selecting.

Some examples of the method, apparatuses, and non-transitory computer-readable medium described herein may further include operations, features, means, or instructions for transmitting, to the UE, a set of multiple network operation sequences associated with a set of multiple component carriers, the set of multiple network operation sequences including the first network operation sequence and the second network operation sequence, where the set of multiple network operation sequences include at least a threshold quantity of network operation sequences that may be associated with a latency that satisfies a latency threshold, a data rate that satisfies a data rate threshold, or both.

Some examples of the method, apparatuses, and non-transitory computer-readable medium described herein may further include operations, features, means, or instructions for transmitting, to the UE, an indication of the threshold quantity of network operation sequences.

In some examples of the method, apparatuses, and non-transitory computer-readable medium described herein, where the first network operation sequence may be associated with a first latency and a first data rate, where the first latency, the first data rate, or both, may be determined based on a first identifier associated with the first network operation sequence, the first set of network operation modes, or both and where the second network operation sequence may be associated with a second latency and a second data rate, where the second latency, the second data rate, or both, may be determined based on a second identifier associated with the second network operation sequence, the second set of network operation modes, or both.

Some examples of the method, apparatuses, and non-transitory computer-readable medium described herein may further include operations, features, means, or instructions for transmitting, via the first control signaling, the second control signaling, or both, an indication of a first latency, a first data rate, or both, associated with the first network operation sequence, and an indication of a second latency, a second data rate, or both, associated with the second network operation sequence.

Some examples of the method, apparatuses, and non-transitory computer-readable medium described herein may further include operations, features, means, or instructions for transmitting, via the first control signaling, the second control signaling, or both, an indication of a first peak data rate associated with the first network operation sequence, and a second peak data rate associated with the second network operation sequence.

Some examples of the method, apparatuses, and non-transitory computer-readable medium described herein may further include operations, features, means, or instructions for determining a time duration during which neither of the first network operation sequence or the second network operation sequence exhibits a data rate that satisfies a threshold data rate and determining, based on determining the time duration, a modified version of the second network operation sequence that exhibits an additional data rate throughout the time duration, where the additional data rate satisfies the threshold data rate, where communicating with the UE via the second component carrier includes communicating during the time duration in accordance with the modified version of the second network operation sequence.

Some examples of the method, apparatuses, and non-transitory computer-readable medium described herein may further include operations, features, means, or instructions for determining a time duration during which neither of the first network operation sequence or the second network operation sequence exhibits a data rate that satisfies a threshold data rate and during which both the first network operation sequence and the second network operation sequence may be associated with a power saving mode of the first and second sets of network operation modes and determining, based on determining the time duration, a modified version of the second network operation sequence, where the modified version of the second network operation sequence includes an inactive network operation mode throughout the time duration.

Some examples of the method, apparatuses, and non-transitory computer-readable medium described herein may further include operations, features, means, or instructions for comparing a first network operation mode of the first set of network operation modes and a second network operation mode of the second set of network operation modes based on the first network operation mode and the second network operation mode at least partially overlapping in a time domain and determining a modified version of the first network operation mode, the second network operation mode, or both, based on the comparison and in accordance with a network sequence configuration, the network sequence configuration defining one or more conditions, one or more restrictions, or both, associated with network operation modes across the first component carrier and the second component carrier.

Some examples of the method, apparatuses, and non-transitory computer-readable medium described herein may further include operations, features, means, or instructions for transmitting an indication of the network sequence configuration via the first control signaling, the second control signaling, additional control signaling, or any combination thereof.

In some examples of the method, apparatuses, and non-transitory computer-readable medium described herein, the first component carrier may be associated with a PCell and the second component carrier may be associated with an SCell.

In some examples of the method, apparatuses, and non-transitory computer-readable medium described herein, the first network operation sequence may be associated with a first set of parameters, the second network operation sequence may be associated with a second set of parameters different from the first set of parameters, and the first set of parameters, the second set of parameters, or both, include a network energy consumption level, a maximum data rate, or both.

In some examples of the method, apparatuses, and non-transitory computer-readable medium described herein, the first control signaling may be the same as the second control signaling.

In some examples of the method, apparatuses, and non-transitory computer-readable medium described herein, the first set of network operation modes, the second set of network operation modes, or both, include a first network energy saving mode, a second network energy saving mode, a flexible mode, a legacy mode, an inactive mode, or any combination thereof.

DETAILED DESCRIPTION

Figure 1:
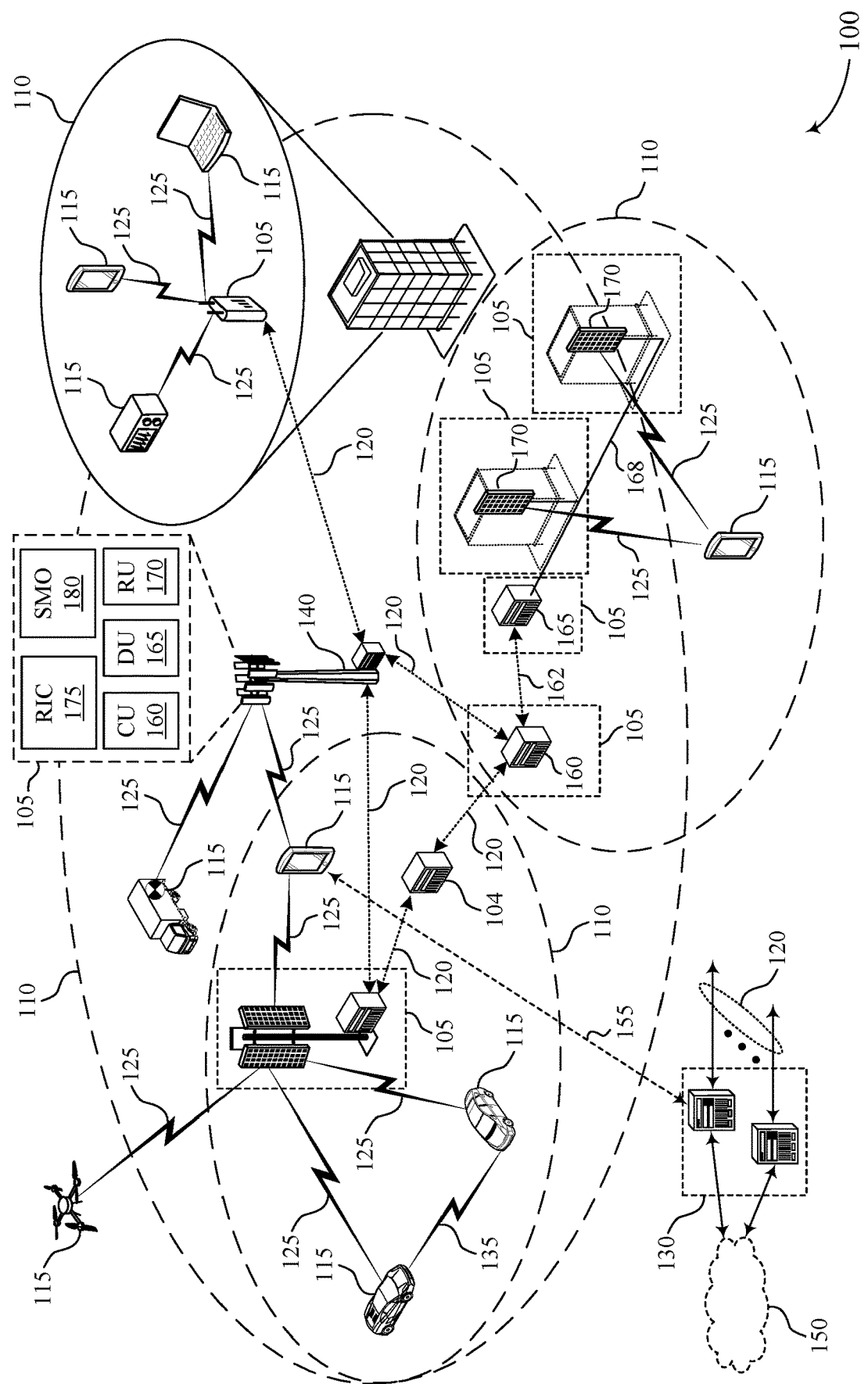
FIG. 1 illustrates an example of a wireless communications system that supports techniques for network energy saving sequences and cell interaction in accordance with one or more aspects of the present disclosure.

In some wireless communications systems, network entities (e.g., base stations) consume large amounts of power, especially in Fifth Generation (5G) wireless communications systems. As such, there is a need to reduce network power consumption, while still managing traffic loads within the network. One technique that has been proposed is the use of "network operation sequences" that include different network operation modes. For example, a network entity operating in accordance with a network operation sequence may transition through various operation modes that provide varying levels of energy savings, support varying data rates and/or different types of communications, etc. Such network operation sequences may enable network entities to more effectively balance traffic needs with the desire to reduce power consumption. However, network operation sequences implemented at network entities may offer only limited flexibility, and may not enable the network entities to adequately handle traffic loads while simultaneously providing power savings.

Accordingly, aspects of the present disclosure are directed to cell-specific (e.g., component carrier-specific) network operation sequences that may be implemented by network entities. In particular, aspects of the present disclosure may enable a network entity (e.g., base station) to configure multiple network operation sequences on a cell-by-cell (e.g., component carrier-by-component carrier) basis. For example, a first component carrier (e.g., primary cell (PCell)) supported by a network entity may be associated with a first network operation sequence, and second component carrier (e.g., secondary cell (SCell)) supported by the network entity may be associated with a second network operation sequence that is separate and independent from the first network operation sequence. In some aspects, network operation sequences may be signaled to UEs 115 (and other wireless devices) so that the UEs 115 can communicate with the network entity 105 in accordance with the respective network operation sequences. The use of separate network operation sequences may enable some component carriers to operate in lower-power consumption modes, while simultaneously enabling the network to accommodate network traffic.

In some aspects, different network operation sequences may be configured with different parameters or restrictions. For example, a network operation sequence for a PCell may enable communication of synchronization signal block (SSB) messages, while network operation sequences for SCells may not enable communication of SSB messages. In some cases, the network may operate component carriers/cells in accordance with network operation sequences such that at least a certain quantity of the component carriers/cells are able to accommodate high data rates at any given time.

Aspects of the disclosure are initially described in the context of wireless communications systems. Additional aspects of the disclosure are described in the context of example network operation sequences and an example process flow. Aspects of the disclosure are further illustrated by and described with reference to apparatus diagrams, system diagrams, and flowcharts that relate to techniques for network energy saving sequences and cell interaction.

FIG. 1 illustrates an example of a wireless communications system 100 that supports techniques for network energy saving sequences and cell interaction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for network energy saving sequences and cell interaction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, network entities 105 of the wireless communications system 100 may support cell-specific (e.g., component carrier-specific) network operation sequences. As noted previously herein, the term "network operation sequence" may be used to refer to a series or sequence of different network operation modes which enables network entities to transition through the various operation modes that provide varying levels of energy savings and data rates.

In particular, aspects of the present disclosure may enable a network entity 105 (e.g., base station) to configure multiple network operation sequences on a cell-by-cell basis. For example, a first component carrier (e.g., first cell, or PCell) supported by a network entity 105 may be associated with a first network operation sequence, and second component carrier (e.g., second cell, or SCell) supported by the network entity 105 may be associated with a second network operation sequence that is separate and independent from the first network operation sequence. In some aspects, network operation sequences may be signaled to UEs 115 (and other wireless devices) so that the UEs 115 can communicate with the network entity 105 in accordance with the respective network operation sequences. The use of separate network operation sequences may enable some component carriers to operate in lower-power consumption modes, while simultaneously enabling the network entity 105 to accommodate network traffic.

In some aspects, different network operation sequences may be configured with different parameters or restrictions. For example, a network operation sequence for a PCell may enable communication of SSB messages, while network operation sequences for SCells may not enable communication of SSB messages. In some cases, a network entity 105 may operate component carriers/cells in accordance with network operation sequences such that at least a certain quantity of the component carriers/cells are able to accommodate high data rates (and/or low latency traffic) at any given time. In cases where there are insufficient component carriers or cells which are able to accommodate high data rates or low-latency traffic, the network entity 105 may be configured to dynamically adjust one or more network operation sequences to ensure that at least a minimum quantity of component carriers are able to accommodate high data rates or low-latency traffic. Moreover, UEs 115 within the wireless communications system 100 may also expect a certain quantity of the component carriers/cells are able to accommodate high data rates at any given time, and may therefore expect or predict the network entity 105 to dynamically adjust network operation sequences in a predictable manner to ensure a minimum quantity of high data rate network operation sequences.

Techniques described herein may enable network entities 105 to implement network operation sequences on a component carrier-by-component carrier basis (e.g., cell-by-cell basis). As such, techniques described herein may enable network entities 105 to implement network operation sequences with a finer granularity as compared to some conventional techniques, and may thereby enable network entities to more efficiently and effectively support network traffic while simultaneously reducing power consumption. In particular, techniques described herein may be used to ensure that some minimum quantity of component carriers are able to support high data rates, while remaining component carriers may be operated in accordance with low power-consumption network operation sequences. As such, techniques described herein may enable the network to ensure that network traffic can be accommodated, while lowering the overall power consumption of the network.

Figure 2:
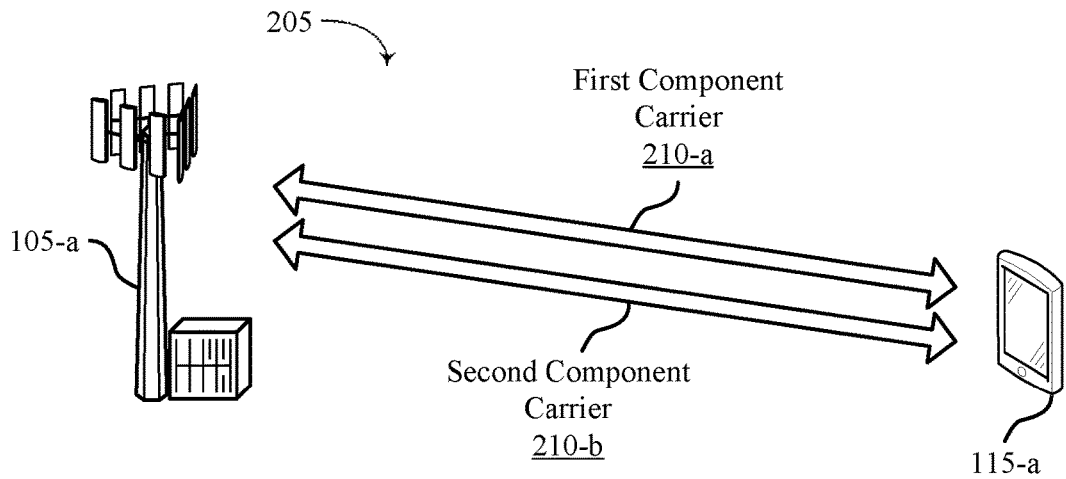
FIG. 2 illustrates an example of a wireless communications system that supports techniques for network energy saving sequences and cell interaction in accordance with one or more aspects of the present disclosure.
Figure 2:
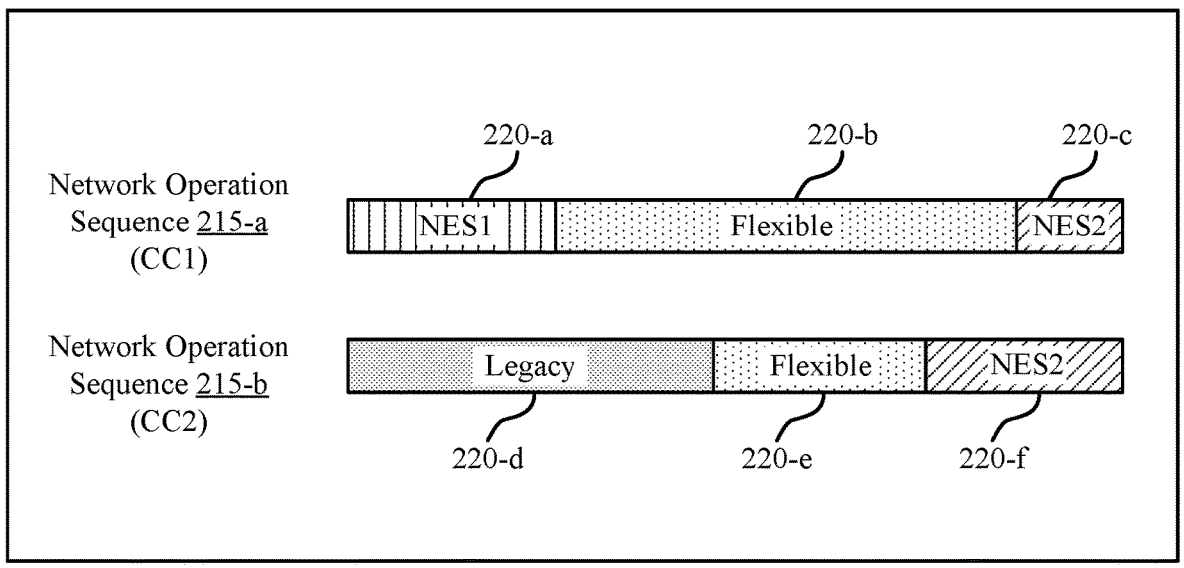

FIG. 2 illustrates an example of a wireless communications system 200 that supports techniques for network energy saving sequences and cell interaction in accordance with one or more aspects of the present disclosure. In some examples, aspects of the wireless communications system 200 may implement, or be implemented by, aspects of the wireless communications system 100. In particular, the wireless communications system 200 may support signaling, configurations, and other mechanisms which enable passive devices to determine a relative priority of read and write operations that are to be performed at the respective passive devices, as described with respect to FIG. 1.

The wireless communications system 200 may include a network entity 105-*a* and a UE 115-*a*. The UE 115-*a* may communicate with the network entity 105-*a* using a communication link 205, which may be an example of an NR or LTE link between the respective UE 115-*a* and the network entity 105-*a*. In some cases, the communication link 205 may include an example of an access link (e.g., Uu links) which may include a bi-directional link that enables both uplink and downlink communication. For example, the UE 115-*a* may transmit uplink signals, such as uplink control signals or uplink data signals, to one or more components of the network entity 105-*a* using the communication link 205, and one or more components of the network entity 105-*a* may transmit downlink signals, such as downlink control signals or downlink data signals, to the UE 115-*a* using the communication link 205.

In some implementations, the network entity 105-*a* may support wireless communications via one or more serving cells (e.g., PCell, SCell) or component carriers. In this regard, the communication link 205 may be associated with one or more serving cells, one or more component carriers, or both. For example, as shown in FIG. 2, the communication link 205 may include (or be associated with) a first component carrier 210-*a* and a second component carrier 210-*b*. As will be described in further detail herein, aspects of the present disclosure may enable network operation sequences to be implemented on per-component carrier 210 basis, a per-serving cell basis, or both. As such, for the purposes of the present disclosure, the terms "component carrier" and "serving cell" may be used interchangeably with respect to the implementation of network operation sequences. For instance, referring to FIG. 2, the first component carrier 210-*a* may include (or be associated with) a first serving cell, such as a PCell, and the second component carrier 210-*b* may include (or be associated with) a second serving cell, such as an SCell.

As noted previously herein, network entities (e.g., base stations) consume large amounts of power. Network energy consumption accounts for approximately 23% of the total expense associated with operating a cellular network. Most energy consumption within a cellular network is associated with a RAN. For example, approximately 50% of 5G network energy consumption comes from RAN. As such, there is a need to reduce network power consumption, while still managing traffic loads within the network.

Energy consumption of network entities 105 is based on a number of factors, including power amplifier (PA) efficiency, a quantity of Tx/Rx antennas operated (e.g., the Tx radio distribution unit (TxRU) interface), traffic load, sleep states and associated transition times for transitioning into and out of sleep states, and one or more reference parameters/configurations. Techniques used to reduce network energy consumption may be evaluated on a number of different key performance indicators (KPIs) related to network and UE 115 performance, including spectral efficiency, capacity, user perceived throughput (UPT), latency, handover performance, call drop rate, initial access performance, service-level agreement (SLA) assurance-related parameters, energy efficiency, UE 115 power consumption, and complexity.

One technique that has been proposed to reduce network power consumption is the concept of network sleep modes. In particular, network entities 105 may enter different "sleep modes" based on network traffic. Sleep modes may include, but are not limited to, light sleep modes, "legacy" operation modes, deep sleep modes, and the like. Different sleep modes may have different power consumption levels, and require different transition times for the network entity 105 to transition into and out of the respective sleep modes.

Moreover, sleep modes may be operated differently in accordance with a number of parameters. For example, some sleep modes may cause a network entity 105 to turn off radio frequency chains to reduce power consumption, while other sleep modes may maintain some level of radio frequency chain operation.

Building on the concept of network sleep modes, some wireless communications systems may enable the use of "network operation sequences" that include a series or sequence of different network operation modes (e.g., sequence/series of different sleep modes). For example, a network entity 105 operating in accordance with a network operation sequence may transition through various operation network operation modes (e.g., various sleep modes) that provide varying levels of energy savings, support different data rates and/or data latencies, etc. Network operation sequences may cause a network entity 105 to transition through a series or sequence of different operation modes (and/or sleep modes) according to some periodicity. Such network operation sequences may enable network entities 105 to more effectively balance traffic needs with the desire to reduce power consumption. As such, network operation modes may provide a semi-static approach to reduce network power consumption.

Network operation modes that may be implemented in accordance with network operation sequences may include any operation mode or sleep mode, including a first network energy savings (NES) mode (e.g., NES1), a second network energy savings mode (e.g., NES2), a flexible mode (e.g., mode that enables the network to dynamically adapt to different operation modes, mode dynamically indicated by the network depending on current traffic conditions), a legacy operation mode (e.g., normal or "full-capacity" network operation), and the like. For the purposes of the present disclosure, the term "network operation mode" may refer to a specific operation by a network entity that is intended to facilitate network traffic and/or reduce network energy consumption. As such, different network operation modes may be associated with different parameters, including power consumption, latency, data rates, throughput, and the like. Network entities may apply different energy savings techniques for respective network operation modes. For example, different operation modes may reduce network energy consumption by reducing a quantity of operational antenna ports, reducing transmit power, and the like. In this regard, the term "network operation mode" may include or encompass network sleep modes.

Conventional wireless communications systems may implement network operation sequences on a per-network entity 105 basis. That is, each network entity 105 within a wireless communications system may implement a single network operation sequence (e.g., first network operation sequence implemented by first network entity 105, second network operation sequence implemented by second network entity 105). However, network operation sequences implemented at network entities 105 may offer only limited flexibility, and may not enable the network entities 105 to adequately handle traffic loads while simultaneously providing power savings.

Accordingly, aspects of the present disclosure are directed to cell-specific (e.g., component carrier-specific) network operation sequences that may be implemented by network entities. In particular, aspects of the present disclosure may enable a network entity 105 (e.g., base station) to configure multiple network operation sequences on a component carrier-by-component carrier or cell-by-cell basis. In this regard, aspects of the present disclosure enable component carrier-specific network operation sequences that enable component carriers 210/serving cells to dynamically be switched on and off (or switched between operation modes) in order to save network energy when the network load does not require multiple component carriers 210 or multiple serving cells.

The wireless communications system 200 described herein may support cell-specific (or component carrier-specific) network operation sequences that may be semi-statically and/or dynamically configured or modified in order to enable the network entity 105-a to manage operation and traffic loads in a flexible manner, and to accommodate operation of both legacy, advanced, and future UEs 115. Extending network operation sequences across component carriers 210 may enable the network entity 105-a to enable or operate according to different network operation modes across component carriers 210, and accordingly save energy depending on the network load.

For example, as shown in FIG. 2, the first component carrier 210-a (e.g., first serving cell) supported by the network entity 105-a may be associated with a first network operation sequence 215-a, and the second component carrier 210-b (e.g., second serving cell) supported by the network entity 105-a may be associated with a second network operation sequence 215-b. In this example, the UE 115-a may then be configured to communicate with the network entity 105-a via the first component carrier 210-a in accordance with the first network operation sequence 215-a, and may be configured to communicate with the network entity 105-a via the second component carrier 210-b in accordance with the second network operation sequence 215-b.

As noted previously herein, each of the network operation sequences 215 may include one or more network operation modes 220. For instance, the first network operation sequence 215-a may include a first network operation mode 220-a (e.g., NES1 mode), a second network operation mode 220-b (e.g., flexible mode), and a third network operation mode 220-c (e.g., NES2 mode). Similarly, the second network operation sequence 215-b may include a first network operation mode 220-d (e.g., legacy mode), a second network operation mode 220-e (e.g., flexible mode), and a third network operation mode 220-f (e.g., NES2 mode).

In this regard, the network entity 105-a (and the UE 115-a) may be configured to communicate in accordance with the respective network operation modes 220 for respective time intervals of the network operation sequences 215 (e.g., communicate in accordance with first network operation mode 220-a and second network operation mode 220-b during first and second time intervals, respectively). Other network operation modes 220 may include, but are not limited to, additional network energy savings modes, an inactive mode, and the like.

The respective network operation modes 220 may be associated with different sets of parameters, including a network energy consumption level, a data rate (e.g., maximum data rate), a data latency, or any combination thereof. In some implementations, each network operation sequence 215 may be associated with a periodicity and/or valid duration or time interval. For example, the first network operation sequence 215-a may repeat according to a defined periodicity and/or for some valid duration or time interval.

In some aspects, the network entity 105-a may transmit control signaling to the UE 115-a, where the control signaling indicates the respective network energy sequence(s) 215 associated with each respective component carrier 210. For example, the network entity 105-a may transmit RRC signaling, DCI signaling, MAC-CE signaling, or any combination thereof, which indicates the first network operation sequence 215-*a* and the second network operation sequence 215-*b*. In some cases, the UE 115-*a* may be configured with a table or other data object that includes potential/candidate network operation sequences 215, where the control signaling (e.g., RRC signaling) utilizes one or more bit field values or indices indicating which network operation sequences 215 from the table or data object correspond to which component carriers 210 or serving cells.

In some implementations, a single component carrier 210 may be associated with one or more network operation sequences 215. For example, the first component carrier 210-*a* may be associated with a first network operation sequence 215 and a second network operation sequence 215. In such cases, the network entity 105-*a* may be configured to dynamically update or switch network operation sequences 215 for each component carrier 210 via DCI and/or MAC-CE signaling.

Moreover, in cases where a single component carrier 210 is associated with multiple candidate or potential network operation sequences 215, the UE 115-*a*, the network entity 105-*a*, or both, may be configured to select one of the candidate network operation sequences 215 that will be used. Selection of a candidate network operation sequence 215 for a component carrier 210 may be performed based on explicit signaling from the network entity 105-*a*, based on network conditions, based on traffic to be communicated by the UE 115-*a* and/or the network entity 105-*a*, selected in accordance with a network operation sequence configuration, or any combination thereof.

The use of separate network operation sequences 215 for different component carriers 210 and/or serving cells may enable some component carriers 210/serving cells to operate in lower-power consumption modes, while simultaneously enabling the network entity 105-*a* to accommodate network traffic. In other words, techniques described herein may enable different network operation sequences 215 and different network operation modes 220 to be implemented across component carriers 210, and/or across different serving cells, such as a PCell and an SCell. For example, a PCell (e.g., first component carrier 210-*a*) may have different functions and configurations (e.g., different network operation sequences 215) as compared to an SCell (e.g., second component carrier 210-*b*). By enabling different serving cells to be enabled with different network operation sequences 215, different network energy states or network energy consumption levels can be achieved in different serving cells. Moreover, enabling different serving cells to be enabled with different network operation sequences 215 may enable different needs and network loads to be managed across different serving cells or component carriers 210.

In some aspects, different network operation sequences 215 may enable different types of communications, thereby resulting in different network energy consumption levels. One possible network operation mode 220 (and/or network operation sequence 215) may include a mode or sequence that does not enable or allow communication of SSB messages (e.g., SSB-less operation). This may enable partial SSB-less operation on one component carrier 210 or serving cell.

The ability to enable different types of communications (e.g., different types of messages) to be performed across different network operations sequences may be further shown and described with reference to FIG. 3.

Figure 3:
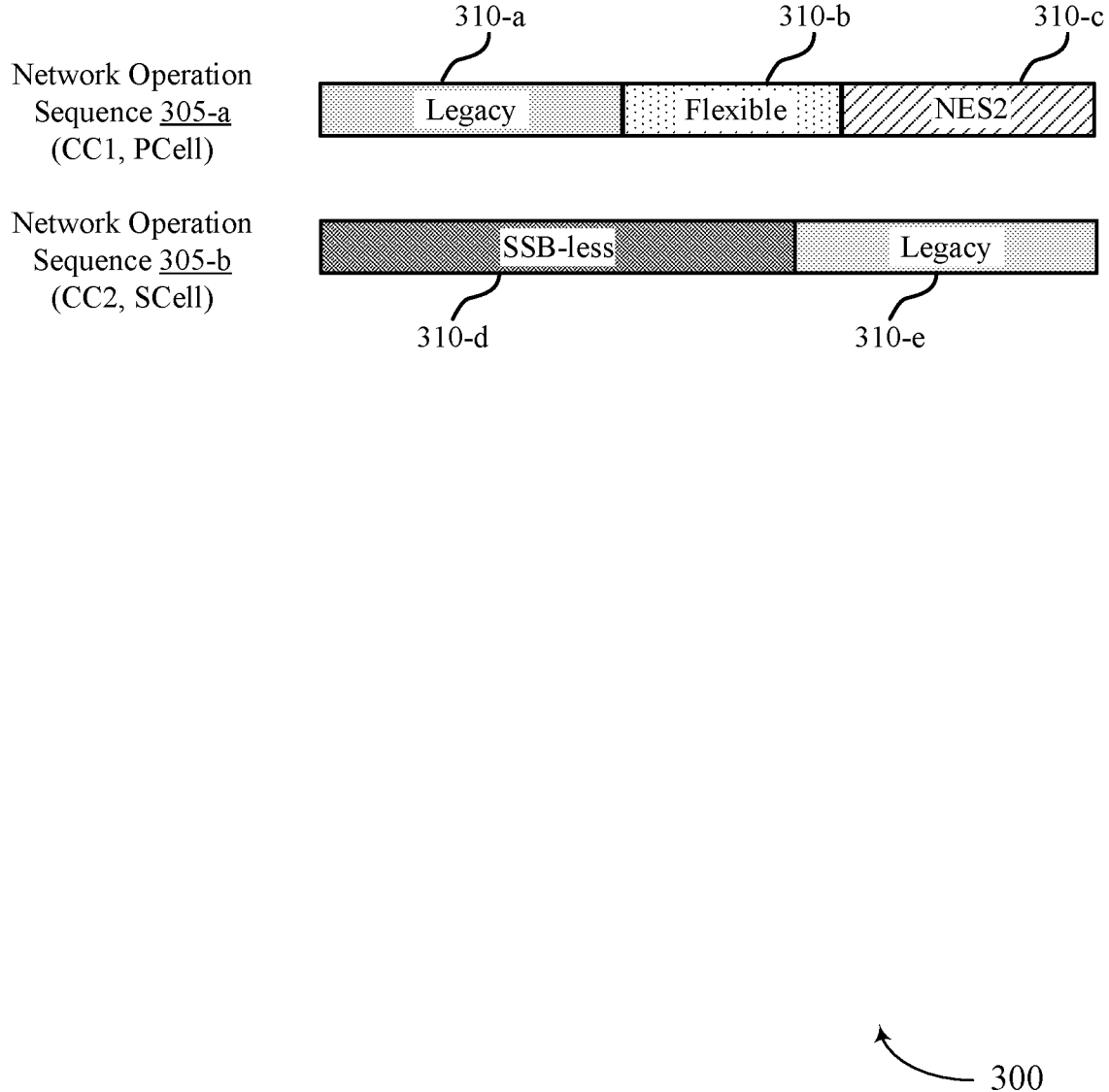
FIG. 3 illustrates an example of a communications configuration that supports techniques for network energy saving sequences and cell interaction in accordance with one or more aspects of the present disclosure.

FIG. 3 illustrates an example of a communications configuration 300 that supports techniques for network energy saving sequences and cell interaction in accordance with one or more aspects of the present disclosure. In some examples, aspects of the communications configuration 300 may implement, or be implemented by, aspects of the wireless communications system 100, the wireless communications system 200, or both.

The communications configuration 300 illustrated in FIG. 3 includes a first network operation sequence 305-*a* and a second network operation sequence 305-*b*. In some implementations, the first network operation sequence 305-*a* and the second network operation sequence 305-*b* may be associated with different component carriers, different serving cells, or both. In this regard, the first network operation sequence 305-*a* and the second network operation sequence 305-*b* illustrated in FIG. 3 may be examples of the first network operation sequence 215-*a* and the second network operation sequence 215-*b* illustrated in FIG. 2.

In this regard, the first network operation sequence 305-*a* illustrated in FIG. 3 may be associated with a first component carrier (e.g., first component carrier 210-*a*, CC1) or a first serving cell, and the second network operation sequence 305-*b* illustrated in FIG. 3 may be associated with a second component carrier (e.g., second component carrier 210-*b*, CC2) or a second serving cell. For example, in some cases, and as illustrated in FIG. 3, the first network operation sequence 305-*a* may be associated with a PCell, and the second network operation sequence 305-*b* may be associated with an SCell.

As noted previously herein, the network operation sequences 305 may include or be associated with different sets of network operation modes 310 (e.g., network operation modes 310-*a*, 310-*b*, 310-*c*, 310-*d*, 310-*e*) for different time intervals. The respective network operation sequences 305 and the respective network operation modes 310 may be associated with different parameters, including different supported data rates, different supported latencies, different network energy consumption levels, different types of supported communications, and the like.

For example, the first network operation sequence 305-*a* associated with the PCell (e.g., first component carrier 210-*a*) may enable communication of SSB messages, whereas the second network operation sequence 305-*b* associated with the SCell (e.g., second component carrier 210-*b*) may not enable or allow for the communication of SSB messages. In particular, the first network operation sequence 305-*a* may always be expected to enable communication of SSB messages, whereas the second network operation sequence 305-*b* may include one or more time intervals or network operation modes 310 that do not enable the communication of SSB messages. For instance, as shown in FIG. 3, the second network operation sequence 305-*b* may include a network operation mode 310-*d* that does not enable communication of SSB messages (e.g., an SSB-less network operation mode 310-*d*).

By disabling or deactivating communication of SSB messages during at least a subset of network operation modes 310 of the second network operation sequence 305-*b*, the overall network energy consumption may be reduced across the SCell/second component carrier 210-*b*. In this example, the SCell may operate without transmitting SSB for a given interval (or all the time), which may enable the network entity 105-*a* to achieve the flexibility for the optimal power saving and performance trade-off, depending on the network load.

In this regard, certain restrictions or condition may apply to network operation sequences 215 associated with the PCell as compared to network operation sequences 215 associated with the SCell. For example, in some cases, a network operation sequence 215-*a* associated with the PCell may always operate in a legacy mode, or may always transmit SSB messages.

Reference will again be made to FIG. 2. In some aspects, there may be certain restrictions or conditions associated with the respective network operation sequences 215 and/or network operation modes 220 across component carriers 210/serving cells. In other words, there may be conditions or restrictions which dictate or control the relations between network operations across component carriers 210 at any given time. For example, in some cases, the network entity 105-*a* and/or the UE 115-*a* may expect have at least one component carrier 210 (or other threshold quantity of component carriers) that is able to support high load traffic and/or accommodate low latency traffic at any given time. Accordingly, in this example, the network entity 105-*a* and/or the UE 115-*a* may expect at least one component carrier 210 (e.g., at least one network operation sequence 215) to operate according to a legacy mode (or other network operation mode 220 that supports high data traffic) at any given time.

In this regard, according so some implementations, a minimum or threshold quantity of component carriers 210 across the configured component carriers 210 (and therefore minimum/threshold quantity of configured network operation sequences 215) may be expected to satisfy certain conditions at any given time. Conditions that may be expected to be satisfied across a minimum or threshold quantity of component carriers 210/serving cells may include, but are not limited to, a low latency threshold, a data rate threshold, capability to transmit SSBs messages, and the like. In other words, the network entity 105-*a* and/or UE 115-*a* may expect that at least a threshold quantity of component carriers 210 and/or threshold quantity of network operations sequences 215 is able to support low latency traffic and/or high data rates at any given time. Similarly, the network entity 105-*a* and/or UE 115-*a* may expect that at least a threshold quantity of component carriers 210 and/or threshold quantity network operations sequences 215 is able to support communication of SSB messages.

In some aspects, the minimum/threshold quantity of component carriers 210, serving cells, and/or network operation sequences 215 that are expected to satisfy certain conditions at any given time may configured (e.g., pre-configured at the UE 115), signaled to the UE 115-*a* (e.g., via RRC signaling, DCI signaling, MAC-CE signaling), or both. Moreover, different network operation sequences 215 and/or network operation modes 220 that satisfy certain conditions (e.g., satisfy a threshold latency, satisfy a threshold data rate, enable communication of SSB messages) may be configured (e.g., pre-configured, defined by the network), signaled to the UE 115-*a* (e.g., via RRC signaling), or both.

For example, the network entity 105-*a* may transmit an RRC message to the UE 115-*a*, where the RRC message indicates which network operation sequences 215 and/or which network operation modes 220 are considered to satisfy a low latency condition and/or a high data rate condition. For instance, the RRC message may indicate that the legacy mode and the NES1 mode support low latency and/or high data rate conditions, where the NES2 mode does not support low latency and/or high data rate conditions.

Moreover, in some implementations, the peak data rate for each network operation sequence 215 and/or each network operation mode 220 may be configured, defined by the network, signaled to the UE 115-*a* (e.g., via RRC), or any combination thereof. In this regard, RRC signaling may be used to define a peak data rate threshold that is to be satisfied by a minimum or threshold quantity of component carriers 210 across all configured component carriers 210 (e.g., threshold quantity of component carriers 210 are expected to satisfy the threshold peak data rate at any given time).

In cases where a minimum/threshold quantity of component carriers 210 and/or network operation sequences 215 do not satisfy some condition or restriction, the UE 115-*a* and/or the network entity 105-*a* may determine one or more modified network operation sequences 215 such that there are at least a minimum/threshold quantity of component carriers 210 and/or network operation sequences 215 that satisfy the respective condition.

For example, the UE 115-*a* and the network entity 105-*a* may expect that, at any given time, at least one component carrier 210 (e.g., at least one network operation sequence 215) is able to facilitate communication of SSB messages. In this example, if the UE 115-*a* and/or the network entity 105-*a* identify that there is a time duration during which neither of the component carriers 210 (neither of the network operation sequences 215) enable communication of SSB messages, the UE 115-*a* and/or the network entity 105-*a* may determine a modified version of a network operation sequence 215 (e.g., change a network operation mode 220) for one of the component carriers to ensure that at least one of the component carriers 210/network operation sequences 215 is able to facilitate communication of SSB messages at any given time.

Figure 4:
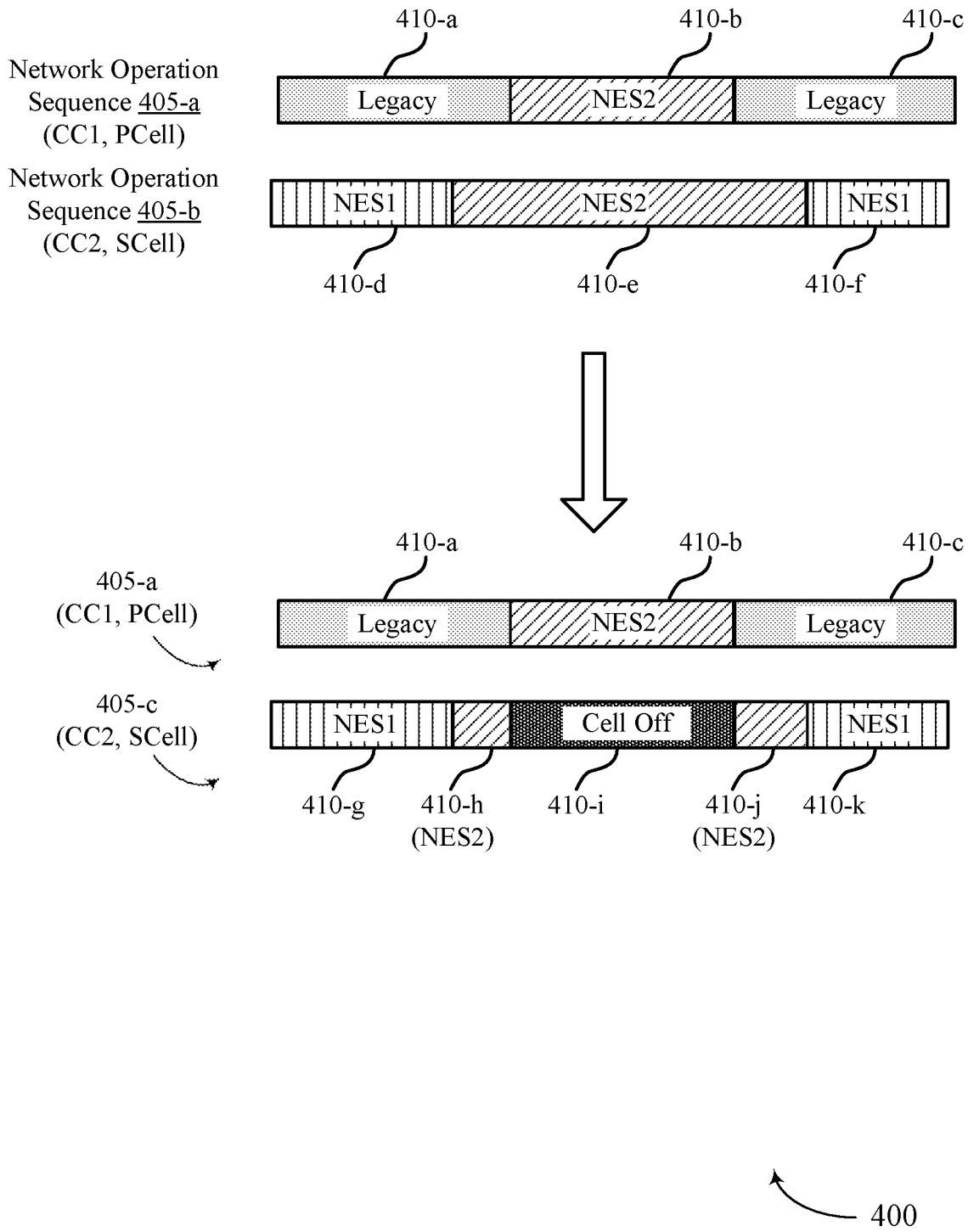
FIG. 4 illustrates an example of a communications configuration that supports techniques for network energy saving sequences and cell interaction in accordance with one or more aspects of the present disclosure.

The modification of network operation sequences 215 will be shown and described in further detail with respect to FIG. 4.

Moreover, in some scenarios, the traffic load within the network and/or at the network entity 105-*a* may be so low that it may not make sense from an energy consumption perspective to operate multiple component carriers 210 in an energy-saving state (e.g., in accordance with an energy-conserving network operation sequence 215 or energy-conserving network operation modes 220). In other words, operating fewer component carriers in higher energy-consuming states (e.g., legacy operation) may result in less power consumption, in the aggregate, as compared to operating multiple component carriers 210 in lower energy-consuming states.

In this regard, if a minimum number of component carriers 210 achieving or exhibiting a threshold data rate (e.g., peak data rate) is zero and there are more than one component carrier 210 operating in a network energy-saving state, the UE 115-*a*, the network entity 105-*a*, or both, may deactivate or "switch off" one or more component carriers (e.g., deactivate the SCell if the PCell is simultaneously operating in energy saving state). Stated differently, the UE 115-*a*, the network entity 105-*a*, or both, may be configured to change one or more network operation modes 220 (or portions of network operation modes 220) to inactive modes in cases where multiple component carriers 210/multiple network operation sequences 215 are operating in energy-conserving network operation modes 220 simultaneously.

Similarly, in some aspects, the wireless communications system 200 may implement restrictions or conditions on pairs of network states (e.g., pairs of network operation sequences 215) to enable the UE 115-*a* and/or the network entity 105-*a* to modify (e.g., deactivate, turn off) certain component carriers 210, network operation sequences 215, and/or network operation modes 220 when the restrictions/conditions are satisfied. In some cases, a network sequence configuration may define or include one or more conditions, one or more restrictions, or both, associated with network operation modes across component carriers 210. In some aspects, the network sequence configuration defining conditions or restrictions on pairs of network states (e.g., pairs of network operation sequences 215) may be configured, signaled to the UE 115-*a* and/or network entity 105-*a*, or any combination thereof.

For example, in some cases, the UE 115-*a* and the network entity 105-*a* may not expect multiple component carriers 210 to be operating in accordance with a NES2 network operation mode 220 at any given time. In other words, a network sequence configuration may include or define a condition/restriction that prevents multiple component carriers to be operated in NES2 simultaneously. In this example, the UE 115-*a* and/or the network entity 105-*a* may switch off or otherwise deactivate a component carrier 210 (e.g., transition a network operation sequence 215 for a component carrier to an inactive mode) in accordance with the network sequence configuration if the UE 115-*a*/network entity 105-*a* determines that multiple component carriers 210 are operating in accordance with NES2 simultaneously.

The ability to modify, switch off, or deactivate component carriers 210, network operation sequences 215, and/or network operation modes 220 in accordance with conditions/restrictions of a network operation sequence will be further shown and described with reference to FIG. 4.

Techniques described herein may enable the network entity 105-*a* to implement network operation sequences on a component carrier-by-component carrier basis (e.g., cell-by-cell basis). As such, techniques described herein may enable the network entity 105-*a* to implement network operation sequences with a finer granularity as compared to some conventional techniques, and may thereby enable network entities to more efficiently and effectively support network traffic while simultaneously reducing power consumption. In particular, techniques described herein may be used to ensure that some minimum quantity of component carriers are able to support high data rates, while remaining component carriers may be operated in accordance with low power-consumption network operation sequences. As such, techniques described herein may enable the network to ensure that network traffic can be accommodated, while lowering the overall power consumption of the wireless communications system 200.

FIG. 4 illustrates an example of a communications configuration 400 that supports techniques for network energy saving sequences and cell interaction in accordance with one or more aspects of the present disclosure. In some examples, aspects of the communications configuration 400 may implement, or be implemented by, aspects of the wireless communications system 100, the wireless communications system 200, the communications configuration 300, or any combination thereof.

The communications configuration 400 illustrates a set of network operation sequences 405, including a first network operation sequence 405-*a*, a second network operation sequence 405-*b*, and a third network operation sequence 405-*c*. As will be described in further detail herein, the third network operation sequence 405-*c* may include a modified version of the second network operation sequence 405-*b*.

In some aspects, the respective network operation sequences 405 may be associated with different component carriers, different serving cells (e.g., PCell, SCell), or both. For example, as shown in FIG. 4, the first network operation sequence 405-*a* may be associated with a first component carrier (e.g., CC1, first component carrier 210-*a*) or a first serving cell (e.g., PCell). Comparatively, the second network operation sequence 405-*b* and the third network operation sequence 405-*c* (e.g., modified version of the second network operation sequence 405-*b*) may be associated with a second component carrier (e.g., CC2, second component carrier 210-*b*) or a second serving cell (e.g., SCell). In this regard, the first network operation sequence 405-*a* illustrated in FIG. 4 may be an example of the first network operation sequence 215-*a* and the first network operation sequence 305-*a* illustrated in FIGS. 2 and 3, respectively. Similarly, the second network operation sequence 405-*b* and/or the third network operation sequence 405-*c* illustrated in FIG. 4 may be an example of the second network operation sequence 215-*b* and the second network operation sequence 305-*b* illustrated in FIGS. 2 and 3, respectively.

The network operation sequences 405 may include or be associated with different sets of network operation modes 410 (e.g., network operation modes 410-*a*, 410-*b* through 410-*k*) for different time intervals. The respective network operation sequences 405 and the respective network operation modes 410 may be associated with different parameters, including different supported data rates, different supported latencies, different network energy consumption levels, different types of supported communications, and the like.

As noted previously herein, in some aspects, a wireless communications system (e.g., wireless communications system 100, 200) may implement restrictions or conditions on pairs of network states (e.g., pairs of network operation sequences 405) to enable the UE 115 and/or the network entity 105 to modify (e.g., deactivate, turn off) certain component carriers 210, network operation sequences 215, and/or network operation modes 220 when the restrictions/conditions are satisfied. In some cases, conditions/restrictions associated with network operation modes across component carriers 210 may be defined by (e.g., included within) a network operation configuration. Such network operation configurations may be pre-configured, signaled to the UE 115 (e.g., via RRC signaling), or both.

For example, referring to FIG. 4, a UE 115 may receive (e.g., via RRC signaling) a network operation configuration including a condition or restriction that multiple component carriers are not expected to be operating in accordance with an energy-saving network operation mode 410, such as NES 2, at any given time. The UE 115 may be further configured to perform communications via a first component carrier using the first network operation sequence 405-*a*, and to perform communications via a second component carrier using the second network operation sequence 405-*b*.

Continuing with the same example, the UE 115 and/or the network entity 105 may determine that both the first component carrier and the second component carrier will be simultaneously operated in accordance with a NES2 network operation mode 410 (e.g., an energy-saving mode). In particular, the UE 115 and/or the network entity 105 may identify that the second network operation mode 410-*b* (NES2) of the first network operation sequence 405-*a* overlaps in the time domain with the second network operation mode 410-*e* (NES2). Accordingly, in this example, the UE 115 and/or the network entity 105 may determine that the first network operation sequence 405-*a* and the second network operation sequence 405-*b* fail to satisfy (e.g., violate) the restrictions/conditions associated with the network operation configuration.

Accordingly, the UE 115 and/or the network entity 105 may selectively modify one of the network operation sequences 405 (e.g., determine a modified version of a network operation sequence 405) in order to ensure satisfaction of the conditions/restrictions of the network operation configuration. For example, as shown in FIG. 4, the UE 115 and/or the network entity 105 may determine third network operation sequence 405-c that is a modified version of the second network operation sequence 405-b. The third network operation sequence 405-c may include a "cell off" network operation mode 410-i (e.g., inactive mode) that overlaps with the second network operation mode 410-b (NES2) of the first network operation sequence 405-a. In this regard, the first network operation sequence 405-a and the third network operation sequence 405-c satisfy the condition/restriction of the network operation sequence in that the respective network operation sequences 405-a and 405-c do not operate in an energy-saving mode simultaneously.

In this regard, UEs 115 and/or network entities 105 may be configured to selectively modify network operation sequences 405 (e.g., modify network operation modes 410) in accordance with network operation configurations to ensure that conditions/restrictions on operation of pairs of network states are satisfied. For example, network operation sequences 405 may be modified to ensure that a minimum/threshold quantity of component carriers/network operation sequences 405 are configured to support communication of SSB messages. By way of another example, network operation sequences 405 may be modified to ensure that a minimum/threshold quantity of component carriers/network operation sequences 405 support a minimum/threshold data rate, a threshold latency, and the like.

Figure 5:
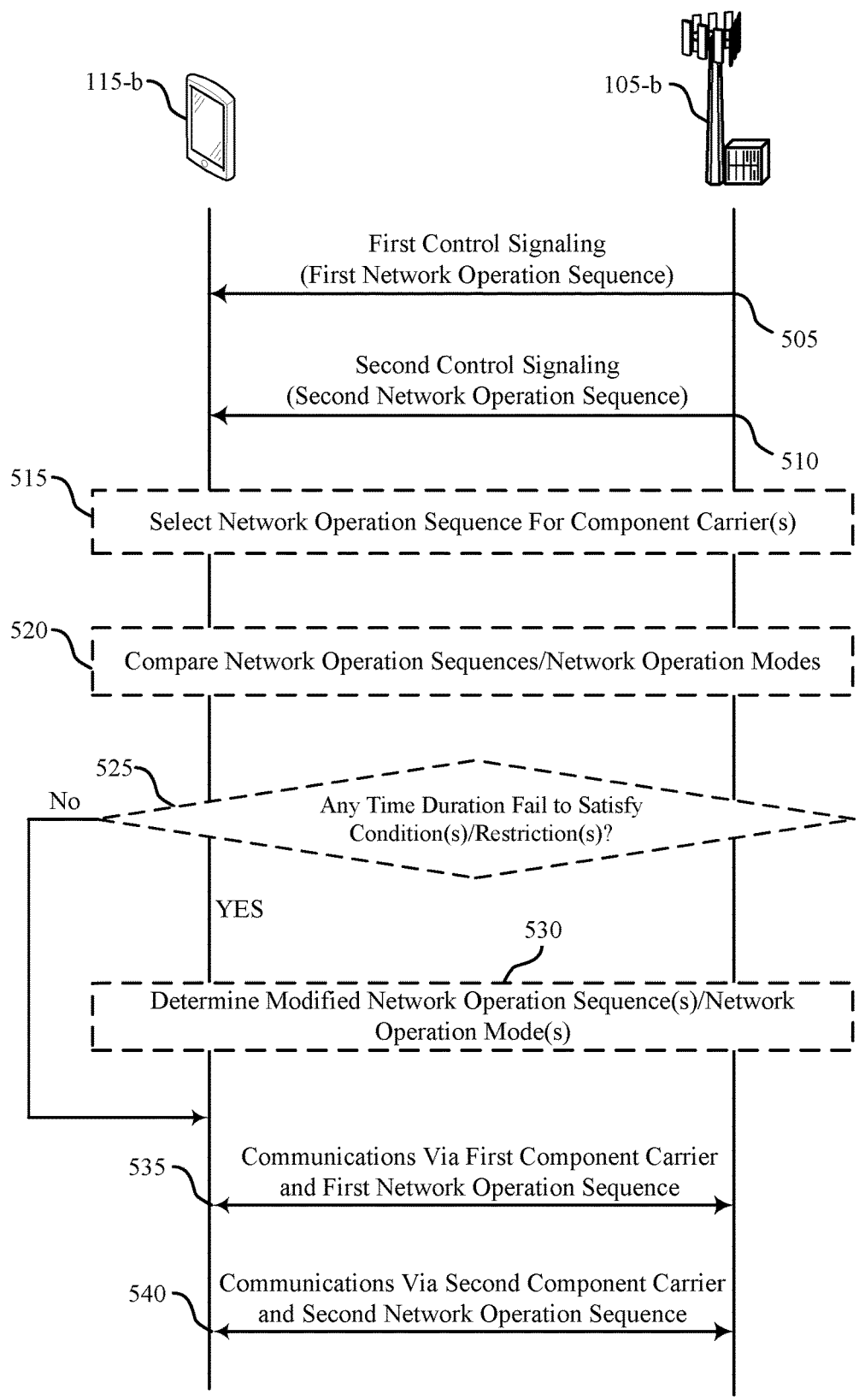
FIG. 5 illustrates an example of a process flow that supports techniques for network energy saving sequences and cell interaction in accordance with one or more aspects of the present disclosure.

FIG. 5 illustrates an example of a process flow 500 that supports techniques for network energy saving sequences and cell interaction in accordance with one or more aspects of the present disclosure. In some examples, aspects of the process flow 500 may implement, or be implemented by, aspects of the wireless communications system 100, the wireless communications system 200, the communications configuration 300, the communications configuration 400, or any combination thereof. In particular, the process flow 500 illustrates signaling between a UE 115-b and a network entity 105-b that enables network operation sequences to be implemented on a component carrier-by-component carrier basis, as described with reference to FIGS. 1-4, among other aspects.

The process flow 500 may include a UE 115-b and a network entity 105-b, which may be examples of UEs 115, network entities 105, and other wireless devices described with reference to FIGS. 1-4. For example, the UE 115-a and the network entity 105-b illustrated in FIG. 4 may be examples of the UE 115-a and the network entity 105-a, as illustrated in FIG. 2.

In some examples, the operations illustrated in process flow 500 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 505, the UE 115-b may receive first control signaling (e.g., RRC message, DCI message, MAC-CE message) indicating a first network operation sequence associated with a first component carrier, a first serving cell (e.g., PCell), or both. For example, the first control signaling may indicate a first identifier (e.g., first network operation sequence identifier) associated with the first network operation sequence. The first network operation sequence may include a first set of time intervals corresponding to a first set of network operation modes for the first component carrier and/or first serving cell. The first set of network operation modes may include a first network energy saving mode (e.g., NES1), a second network energy saving mode (e.g., NES2), a flexible mode, a legacy mode, an inactive mode, or any combination thereof.

At 510, the UE 115-b may receive second control signaling (e.g., RRC message, DCI message, MAC-CE message) indicating a second network operation sequence associated with a second component carrier, a second serving cell (e.g., SCell), or both. For example, the second control signaling may indicate a second identifier (e.g., first network operation sequence identifier) associated with the second network operation sequence. The second network operation sequence may include a second set of time intervals corresponding to a second set of network operation modes for the second component carrier and/or second serving cell. The second set of network operation modes may include a first network energy saving mode (e.g., NES1), a second network energy saving mode (e.g., NES2), a flexible mode, a legacy mode, an inactive mode, or any combination thereof.

The first set of time intervals and the first set of network operation modes associated with the first network operation sequence may be different from the second set of time intervals and the second set of network operation modes associated with the second network operation sequence. That is, the first and second sets of network operation modes may not necessarily be aligned in the time domain, as shown and described in FIGS. 2 and 3.

While the first control signaling at 505 and the second control signaling at 510 are shown and described as separate signaling/messages, this is not to be regarded as a limitation of the present disclosure, unless noted otherwise herein. In this regard, in some implementations, the first control signaling and the second control signaling may be the same. For example, in some implementations, the first network operation sequence and the second network operation sequence may be indicated via a single RRC message.

Moreover, in some implementations, a single component carrier may be associated with one or more network operation sequences. In this regard, the first control signaling at 505 and/or the second control signaling at 510 may indicate multiple potential or candidate network operation sequences for the first and second component carriers. For example, the first control signaling may indicate a first set of candidate network operation sequences (including the first network operation sequence) associated with the first component carrier, and the second control signaling may indicate a second set of candidate network operation sequences (including the second network operation sequence) associated with the second component carrier In some aspects, the first and second network operation sequences may be associated with different sets of parameters or characteristics, including data rates (e.g., maximum or peak data rates), latencies, network energy consumption levels, and the like. Moreover, in some implementations, the first and second network operation sequences may enable or support different types of communications or applications. For example, in some cases, the first network operation sequence (or at least portions of the first network operation sequence) may be configured to enable communication of SSB messages, where the second network operation sequence (or at least portions of the second network operation sequence) may not be configured to enable communication of SSB messages.

In some implementations, the first control signaling and/or the second control signaling may indicate various parameters associated with the first and second network operation sequences. For example, in some cases, the first control signaling may indicate a first set of parameters associated with the first network operation sequence, and the second control signaling may indicate a second set of parameters associated with the second network operation sequence. In this example, the first and second sets of parameters may include data rates (e.g., peak data rates), latencies, types of supported/un-supported communications, and the like. The sets of parameters associated with the respective network operation sequences may be based on identifiers associated with the respective network operation sequences (e.g., network operation sequence IDs), the network operation modes associated with or included within the respective network operation sequences, or any combination thereof.

At 515, the UE 115-*b*, the network entity 105-*b*, or both, may select a network operation sequence that will be used for wireless communications for each of the respective component carriers. In particular, in cases where the first component carrier and/or the second component carrier is associated with multiple candidate network operation sequences, the UE 115-*b*, the network entity 105-*b*, or both, may select which of the network operation sequences will be used for the respective component carrier. In this regard, the UE 115-*b*, the network entity 105-*b*, or both, may select which network operation sequence will be utilized for the respective component carrier(s) at 515 based on receiving/transmitting the first control signaling at 505, receiving/transmitting the second control signaling at 510, or both.

The UE 115-*b* and/or the network entity 105-*b* may select a network operation sequence for a component carrier from a set of candidate network operation sequences for the respective component carrier based on one or more parameters, based on a control message (e.g., DCI message, MAC-CE message) from the network entity 105-*b*, or both. For example, in some cases, the network entity 105-*b* may select which network operation sequence will be used for a given component carrier based on network traffic conditions, based on a quantity of traffic to be transmitted/received by the UE 115-*b* and/or the network entity 105-*b*, or any combination thereof.

At 520, the UE 115-*b*, the network entity 105-*b*, or both, may compare the first network operation sequence and the second network operation sequence. In particular, the UE 115-*b* and/or the network entity 105-*b* may compare the network operation modes associated with the respective network operation sequences. The UE 115-*b* and/or the network entity 105-*b* may compare the network operation sequences/modes at 520 based on receiving/transmitting the first control signaling at 505, receiving/transmitting the first control signaling at 510, selecting the network operation sequence(s) at 515, or any combination thereof. Moreover, the UE 115-*b* and/or the network entity 105-*b* may perform the comparison based on the first and second network operation sequences being activated at the same time (e.g., based on the network operation sequences overlapping in the time domain).

In some aspects, there may be certain restrictions or conditions associated with the respective network operation sequences and/or network operation modes across component carriers/serving cells. In other words, there may be conditions or restrictions which dictate or control the relations between network operations across component carriers at any given time. For example, in some cases, the network entity 105-*b* and/or the UE 115-*b* may expect have at least one component carrier (or other threshold quantity of component carriers) that is able to support high load traffic and/or accommodate low latency traffic at any given time. In other words, the UE 115-*b* and the network entity 105-*b* may expect that a set of network operation sequences configured at the UE 115-*b* include at least a threshold quantity of network operation sequences that are associated with a latency that satisfies a latency threshold, a data rate that satisfies a data rate threshold, or both. By way of another example, the network entity 105-*b* and/or the UE 115-*b* may expect have at least one component carrier (or other threshold quantity of component carriers) that is able to support communication of SSB messages at any given time.

In some aspects, the conditions/restrictions on sets of network operation modes may be configured (e.g., pre-configured at the UE 115-*b*), signaled to the UE 115-*b*, or both. Moreover, in some cases, the threshold quantities of network operation sequences for the respective conditions/restrictions may be explicitly signaled to the UE 115-*b*, pre-configured at the UE 115-*b*, or both. For example, the network entity 105-*b* may signal to the UE 115-*b* that there should be at least two component carriers/network operation sequence (or some other threshold quantity) that should be able to accommodate a high data rate at any given time, and at least one component carrier/network operation sequence (or some other threshold quantity) that should be able to communicate SSB messages at any given time Accordingly, in some aspects, the UE 115-*b* and/or the network entity 105-*b* may perform the comparison at 520 to ensure that conditions/restrictions on sets of network operation sequences are satisfied.

At 525, the UE 115-*b*, the network entity 105-*b*, or both may determine whether there are any time durations that fail to satisfy one or more conditions/parameters associated with sets of network operation sequences. For example, in cases where the UE 115-*b* and the network entity 105-*b* expect for at least one network operation sequence to be able to accommodate a high data rate at any given time, the UE 115-*b* and the network entity 105-*b* may determine whether any time durations do not include a network operation sequence/mode that is able to accommodate a high data rate. In this regard, the UE 115-*b*, the network entity 105-*b*, or both, may perform the analysis at 525 based on receiving/transmitting the first control signaling at 505, receiving/transmitting the first control signaling at 510, selecting the network operation sequence(s) at 515, comparing the network operation sequences/modes at 520, or any combination thereof.

In cases where the UE 115-*b* and/or the network entity 105-*b* identify one or more time durations that fail to satisfy a condition or restriction (Step 525=YES), the process flow 500 may proceed to 530.

At 530, the UE 115-*b*, the network entity 105-*b*, or both, may identify a new network operation sequence/mode, or a modified version of the first or second network operation sequence. In other words, in some cases, the UE 115-*b* and/or network entity 105-*b* may identify new or modified versions of a network operation sequence that will be used such that the respective conditions/restrictions on the set of network operation sequences is satisfied.

For example, the UE 115-*b* may identify a time duration at 525 during which neither of the first network operation sequence or the second network operation sequence exhibits a data rate that satisfies a threshold data rate. In this example, at 530, the UE 115-*b* may determine or identify a modified version of the second network operation sequence that exhibits a data rate throughout the identified time duration which satisfies the threshold data rate. In other words, the UE 115-*b* may modify a network operation mode (or portion of a network operation mode) of the second network operation sequence so that the modified version of the second network operation sequence satisfies the threshold data rate throughout the time duration identified at 525.

By way of another example, and as shown in FIG. 4, the network entity 105-*b* may identify a time duration at 525 during which neither of the first network operation sequence or the second network operation sequence exhibits a data rate that satisfies a threshold data rate and during which both the first network operation sequence and the second network operation sequence are associated with a power saving mode. In this example, the network entity 105-*b* may determine a modified version of the second network operation sequence so that the modified version of the second network operation sequence includes an inactive network operation mode throughout the time duration identified at 525.

In some cases, new and/or modified versions of network operation sequences may be signaled to the UE 115-*b* and/or the network entity 105-*b* so that the respective devices are on the same page with respect to the network operation sequences that will be used. Additionally, or alternatively, the UE 115-*b* and/or the network entity 105-*b* may be configured to modify network operation sequences (or select new network operation sequences) in accordance with a network sequence configuration. In such cases, the network sequence configuration may define one or more conditions, one or more restrictions, or both, associated with network operation modes across the first component carrier and the second component carrier. In other words, the network operation sequence may define rules, conditions, or restrictions that dictate how network operation sequences are modified or selected. In this regard, by utilizing the same network sequence configuration, the respective devices are on the same page with respect to the network operation sequences that will be used. In some aspects, the network operation sequence may be configured at the UE 115-*b*, signaled to the UE 115-*a* (e.g., via the first control signaling and/or the second control signaling), or both.

Upon determining a modified version of a network operation sequence (or selecting a new network operation sequence), the process flow 500 may proceed to step 535.

Reference will again be made to step 525 of process flow 500. In cases where the UE 115-*b* and/or the network entity 105-*b* do not identify any time durations that fail to satisfy a condition or restriction (e.g., all time durations satisfy respective conditions/restrictions) (Step 525=NO), the process flow 500 may proceed to 535.

At 535, the UE 115-*b* and the network entity 105-*b* may communicate with one another using the first component carrier and in accordance with the first network operation sequence. For example, as shown in FIG. 2, the UE 115-*b* and the network entity 105-*b* may communicate via the first component carrier or first serving cell (e.g., PCell) in accordance with the first network operation sequence 215-*a*. In cases where the first network operation sequence is modified at 530, the respective devices may communicate with each other via the first component carrier/serving cell in accordance with the modified version of the first network operation sequence.

For example, in cases where the first network operation sequence enables communication of SSB messages, the UE 115-*b* may receive an SSB message from the network entity 105-*b* via the first component carrier and in accordance with the first network operation sequence.

At 540, the UE 115-*b* and the network entity 105-*b* may communicate with one another using the second component carrier and in accordance with the second network operation sequence. For example, as shown in FIG. 2, the UE 115-*b* and the network entity 105-*b* may communicate via the second component carrier or second serving cell (e.g., SCell) in accordance with the second network operation sequence 215-*b*. In cases where the second network operation sequence is modified at 530, the respective devices may communicate with each other via the second component carrier/serving cell in accordance with the modified version of the second network operation sequence.

Techniques described herein may enable the network entity 105-*b* to implement network operation sequences on a component carrier-by-component carrier basis (e.g., cell-by-cell basis). As such, techniques described herein may enable the network entity 105-*b* to implement network operation sequences with a finer granularity as compared to some conventional techniques, and may thereby enable network entities to more efficiently and effectively support network traffic while simultaneously reducing power consumption. In particular, techniques described herein may be used to ensure that some minimum quantity of component carriers are able to support high data rates, while remaining component carriers may be operated in accordance with low power-consumption network operation sequences. As such, techniques described herein may enable the network to ensure that network traffic can be accommodated, while lowering the overall power consumption of the wireless communications system.

Figure 6:
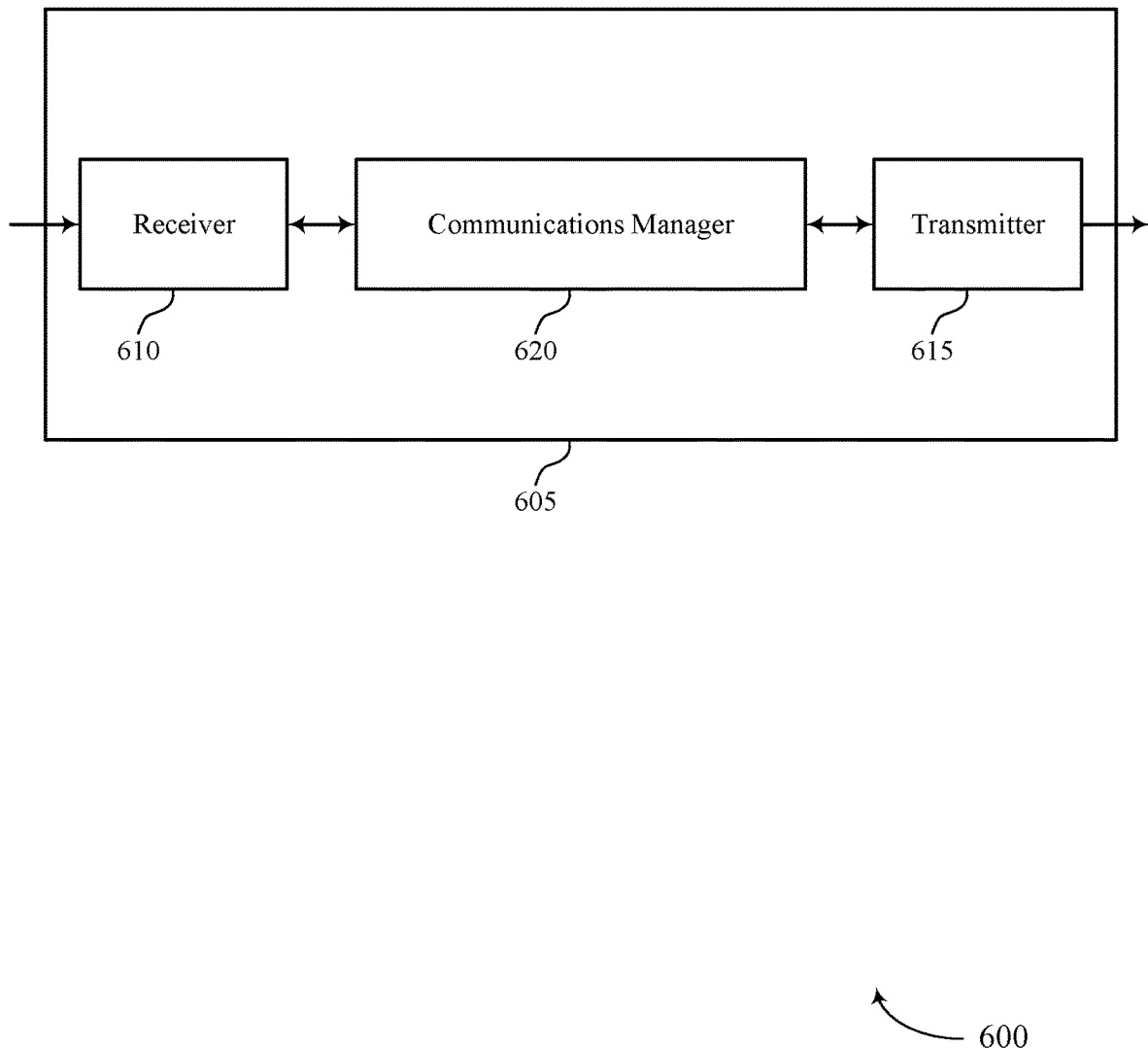
FIGS. 6 and 7 show block diagrams of devices that support techniques for network energy saving sequences and cell interaction in accordance with one or more aspects of the present disclosure.

FIG. 6 shows a block diagram 600 of a device 605 that supports techniques for network energy saving sequences and cell interaction in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for network energy saving sequences and cell interaction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for network energy saving sequences and cell interaction). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for network energy saving sequences and cell interaction as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 may be configured as or otherwise support a means for receiving first control signaling indicating a first network operation sequence associated with a first component carrier, the first network operation sequence including a first set of time intervals corresponding to a first set of network operation modes for the first component carrier. The communications manager 620 may be configured as or otherwise support a means for receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The communications manager 620 may be configured as or otherwise support a means for communicating via the first component carrier in accordance with the first network operation sequence. The communications manager 620 may be configured as or otherwise support a means for communicating via the second component carrier in accordance with the second network operation sequence.

By including or configuring the communications manager 620 in accordance with examples as described herein, the device 605 (e.g., a processor controlling or otherwise coupled with the receiver 610, the transmitter 615, the communications manager 620, or a combination thereof) may support techniques that enable network entities 105 to implement network operation sequences on a component carrier-by-component carrier basis (e.g., cell-by-cell basis). As such, techniques described herein may enable network entities 105 to implement network operation sequences with a finer granularity as compared to some conventional techniques, and may thereby enable network entities to more efficiently and effectively support network traffic while simultaneously reducing power consumption. In particular, techniques described herein may be used to ensure that some minimum quantity of component carriers are able to support high data rates, while remaining component carriers may be operated in accordance with low power-consumption network operation sequences. As such, techniques described herein may enable the network to ensure that network traffic can be accommodated, while lowering the overall power consumption of the network.

Figure 7:
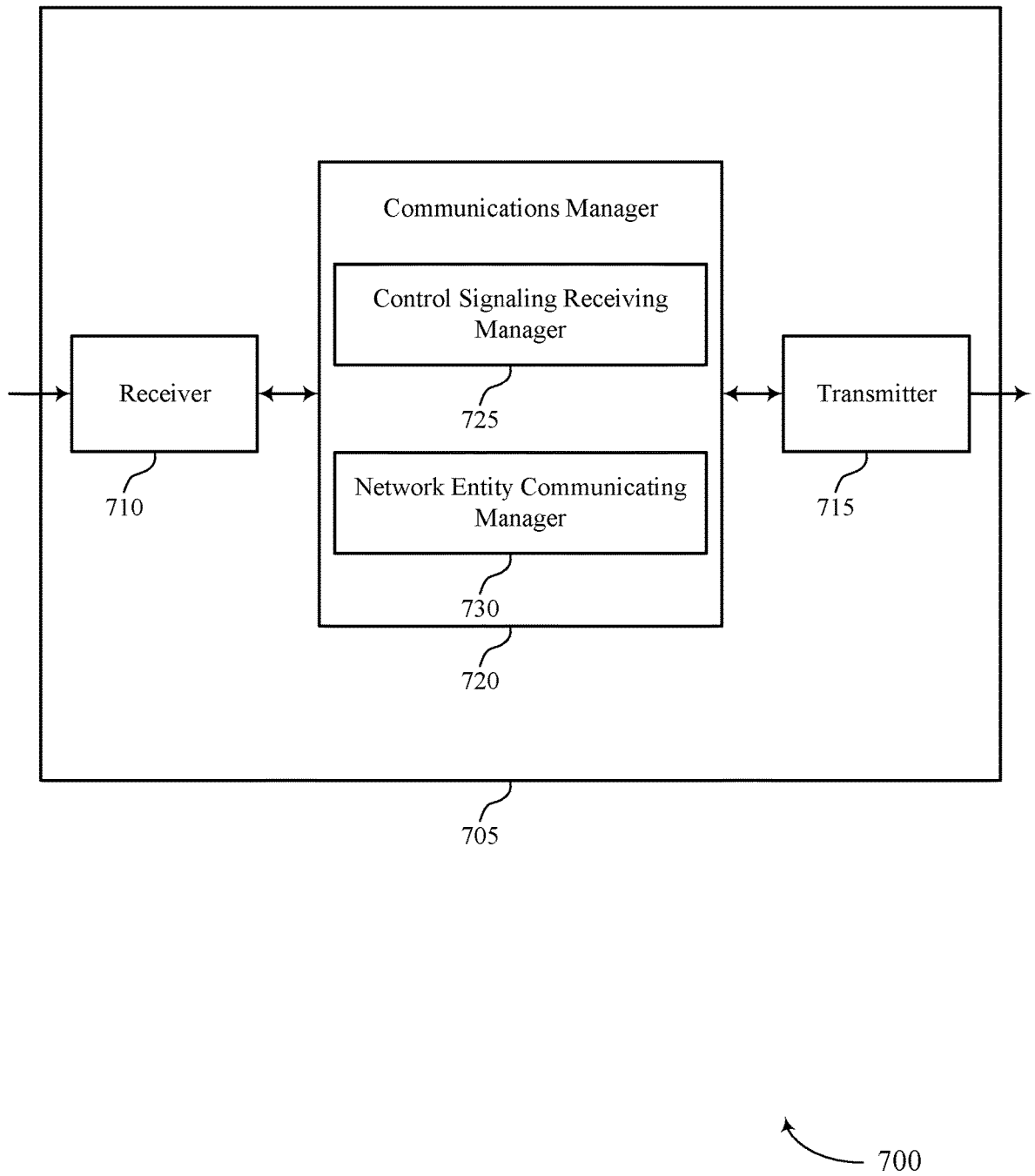

FIG. 7 shows a block diagram 700 of a device 705 that supports techniques for network energy saving sequences and cell interaction in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for network energy saving sequences and cell interaction). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for network energy saving sequences and cell interaction). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for network energy saving sequences and cell interaction as described herein. For example, the communications manager 720 may include a control signaling receiving manager 725 a network entity communicating manager 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The control signaling receiving manager 725 may be configured as or otherwise support a means for receiving first control signaling indicating a first network operation sequence associated with a first component carrier, the first network operation sequence including a first set of time intervals corresponding to a first set of network operation modes for the first component carrier. The control signaling receiving manager 725 may be configured as or otherwise support a means for receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The network entity communicating manager 730 may be configured as or otherwise support a means for communicating via the first component carrier in accordance with the first network operation sequence. The network entity communicating manager 730 may be configured as or otherwise support a means for communicating via the second component carrier in accordance with the second network operation sequence.

Figure 8:
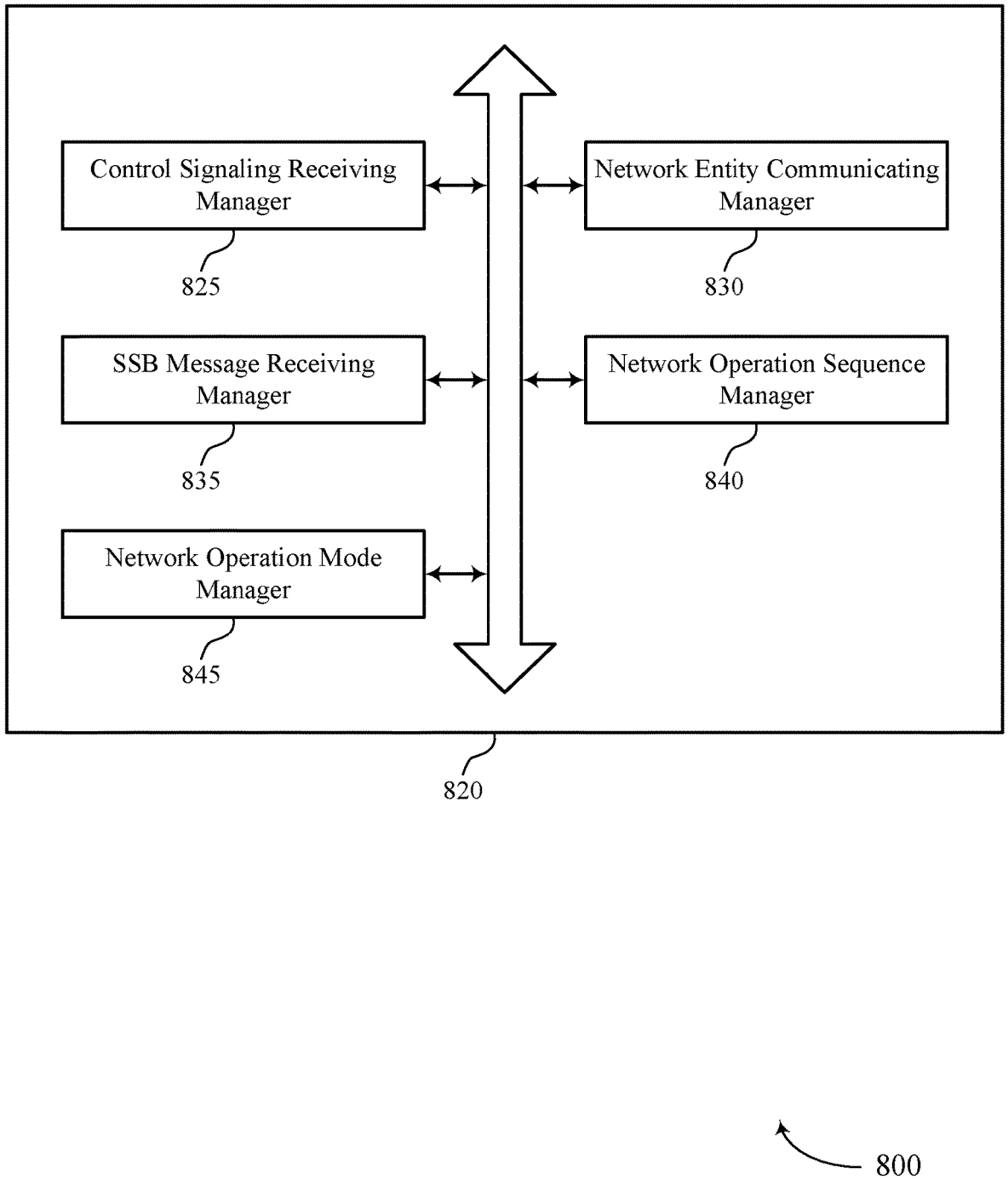
FIG. 8 shows a block diagram of a communications manager that supports techniques for network energy saving sequences and cell interaction in accordance with one or more aspects of the present disclosure.

FIG. 8 shows a block diagram 800 of a communications manager 820 that supports techniques for network energy saving sequences and cell interaction in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for network energy saving sequences and cell interaction as described herein. For example, the communications manager 820 may include a control signaling receiving manager 825, a network entity communicating manager 830, an SSB message receiving manager 835, a network operation sequence manager 840, a network operation mode manager 845, or any combination thereof. Each of these components may communicate, directly or indirectly, with one another (e.g., via one or more buses).

The control signaling receiving manager 825 may be configured as or otherwise support a means for receiving first control signaling indicating a first network operation sequence associated with a first component carrier, the first network operation sequence including a first set of time intervals corresponding to a first set of network operation modes for the first component carrier. In some examples, the control signaling receiving manager 825 may be configured as or otherwise support a means for receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The network entity communicating manager 830 may be configured as or otherwise support a means for communicating via the first component carrier in accordance with the first network operation sequence. In some examples, the network entity communicating manager 830 may be configured as or otherwise support a means for communicating via the second component carrier in accordance with the second network operation sequence.

In some examples, the SSB message receiving manager 835 may be configured as or otherwise support a means for receiving one or more SSB messages via the first component carrier in accordance with the first network operation sequence.

In some examples, the control signaling receiving manager 825 may be configured as or otherwise support a means for receiving, via the first control signaling, an indication of a set of multiple network operation sequences associated with the first component carrier, the set of multiple network operation sequences including the first network operation sequence and a third network operation sequence, the third network operation sequence including a third set of time intervals corresponding to a third set of network operation modes for the first component carrier. In some examples, the network operation sequence manager 840 may be configured as or otherwise support a means for selecting the first network operation sequence from the set of multiple network operation sequences based on one or more parameters, a control message, or both, where communicating via the first component carrier in accordance with the first network operation sequence is based on the selecting.

In some examples, the network operation sequence manager 840 may be configured as or otherwise support a means for receiving a set of multiple network operation sequences associated with a set of multiple component carriers, the set of multiple network operation sequences including the first network operation sequence and the second network operation sequence, where the set of multiple network operation sequences include at least a threshold quantity of network operation sequences that are associated with a latency that satisfies a latency threshold, a data rate that satisfies a data rate threshold, or both. In some examples, the network operation sequence manager 840 may be configured as or otherwise support a means for receiving an indication of the threshold quantity of network operation sequences.

In some examples, where the first network operation sequence is associated with a first latency and a first data rate, where the first latency, the first data rate, or both, are determined based on a first identifier associated with the first network operation sequence, the first set of network operation modes, or both. In some examples, where the second network operation sequence is associated with a second latency and a second data rate, where the second latency, the second data rate, or both, are determined based on a second identifier associated with the second network operation sequence, the second set of network operation modes, or both.

In some examples, the control signaling receiving manager 825 may be configured as or otherwise support a means for receiving, via the first control signaling, the second control signaling, or both, an indication of a first latency, a first data rate, or both, associated with the first network operation sequence, and an indication of a second latency, a second data rate, or both, associated with the second network operation sequence. In some examples, the control signaling receiving manager 825 may be configured as or otherwise support a means for receiving, via the first control signaling, the second control signaling, or both, an indication of a first peak data rate associated with the first network operation sequence, and a second peak data rate associated with the second network operation sequence.

In some examples, the network operation sequence manager 840 may be configured as or otherwise support a means for determining a time duration during which neither of the first network operation sequence or the second network operation sequence exhibits a data rate that satisfies a threshold data rate. In some examples, the network operation sequence manager 840 may be configured as or otherwise support a means for determining, based on determining the time duration, a modified version of the second network operation sequence that exhibits an additional data rate throughout the time duration, where the additional data rate satisfies the threshold data rate, where communicating via the second component carrier includes communicating during the time duration in accordance with the modified version of the second network operation sequence.

In some examples, the network operation sequence manager 840 may be configured as or otherwise support a means for determining a time duration during which neither of the first network operation sequence or the second network operation sequence exhibits a data rate that satisfies a threshold data rate and during which both the first network operation sequence and the second network operation sequence are associated with a power saving mode of the first and second sets of network operation modes. In some examples, the network operation sequence manager 840 may be configured as or otherwise support a means for determining, based on determining the time duration, a modified version of the second network operation sequence, where the modified version of the second network operation sequence includes an inactive network operation mode throughout the time duration.

In some examples, the network operation mode manager 845 may be configured as or otherwise support a means for comparing a first network operation mode of the first set of network operation modes and a second network operation mode of the second set of network operation modes based on the first network operation mode and the second network operation mode at least partially overlapping in a time domain. In some examples, the network operation mode manager 845 may be configured as or otherwise support a means for determining a modified version of the first network operation mode, the second network operation mode, or both, based on the comparison and in accordance with a network sequence configuration, the network sequence configuration defining one or more conditions, one or more restrictions, or both, associated with network operation modes across the first component carrier and the second component carrier.

In some examples, the control signaling receiving manager 825 may be configured as or otherwise support a means for receiving an indication of the network sequence configuration via the first control signaling, the second control signaling, additional control signaling, or any combination thereof, where comparing the first network operation mode and the second network operation mode, determining the modified version, or both, is based on receiving the network sequence configuration.

In some examples, the first component carrier is associated with a PCell. In some examples, the second component carrier is associated with an SCell. In some examples, the first network operation sequence is associated with a first set of parameters. In some examples, the second network operation sequence is associated with a second set of parameters different from the first set of parameters. In some examples, the first set of parameters, the second set of parameters, or both, include a network energy consumption level, a maximum data rate, or both.

In some examples, the first control signaling is the same as the second control signaling. In some examples, the first set of network operation modes, the second set of network operation modes, or both, include a first network energy saving mode, a second network energy saving mode, a flexible mode, a legacy mode, an inactive mode, or any combination thereof.

Figure 9:
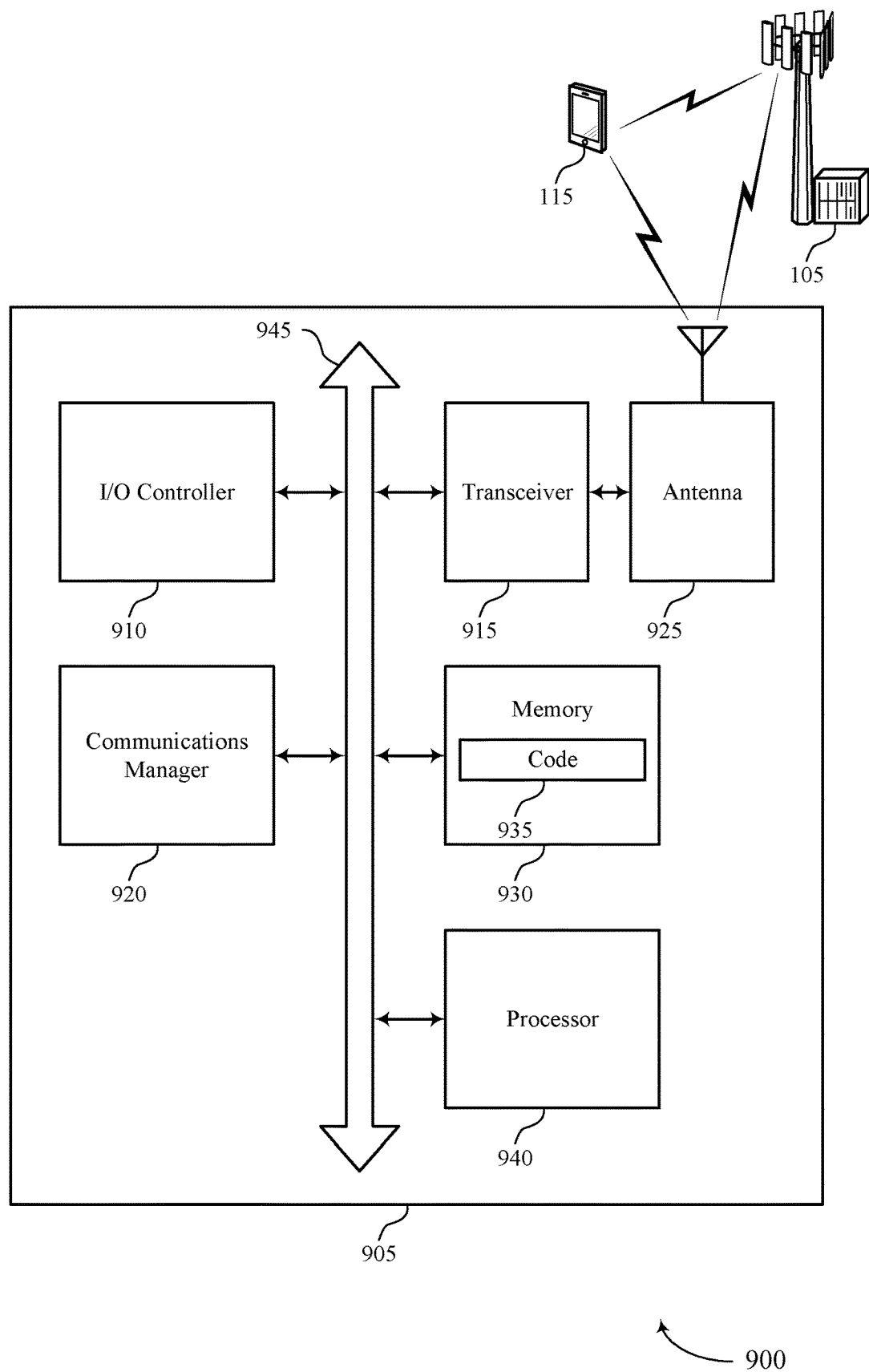
FIG. 9 shows a diagram of a system including a device that supports techniques for network energy saving sequences and cell interaction in accordance with one or more aspects of the present disclosure.

FIG. 9 shows a diagram of a system 900 including a device 905 that supports techniques for network energy saving sequences and cell interaction in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for network energy saving sequences and cell interaction). For example, the device 905 or a component of the device 905 may include a processor 940 and memory 930 coupled with or to the processor 940, the processor 940 and memory 930 configured to perform various functions described herein.

For example, the communications manager 920 may be configured as or otherwise support a means for receiving first control signaling indicating a first network operation sequence associated with a first component carrier, the first network operation sequence including a first set of time intervals corresponding to a first set of network operation modes for the first component carrier. The communications manager 920 may be configured as or otherwise support a means for receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The communications manager 920 may be configured as or otherwise support a means for communicating via the first component carrier in accordance with the first network operation sequence. The communications manager 920 may be configured as or otherwise support a means for communicating via the second component carrier in accordance with the second network operation sequence.

By including or configuring the communications manager 920 in accordance with examples as described herein, the device 905 may support techniques that enable network entities 105 to implement network operation sequences on a component carrier-by-component carrier basis (e.g., cell-by-cell basis). As such, techniques described herein may enable network entities 105 to implement network operation sequences with a finer granularity as compared to some conventional techniques, and may thereby enable network entities to more efficiently and effectively support network traffic while simultaneously reducing power consumption. In particular, techniques described herein may be used to ensure that some minimum quantity of component carriers are able to support high data rates, while remaining component carriers may be operated in accordance with low power-consumption network operation sequences. As such, techniques described herein may enable the network to ensure that network traffic can be accommodated, while lowering the overall power consumption of the network.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for network energy saving sequences and cell interaction as described herein, or the processor 940 and the memory 930 may be otherwise configured to perform or support such operations.

Figure 10:
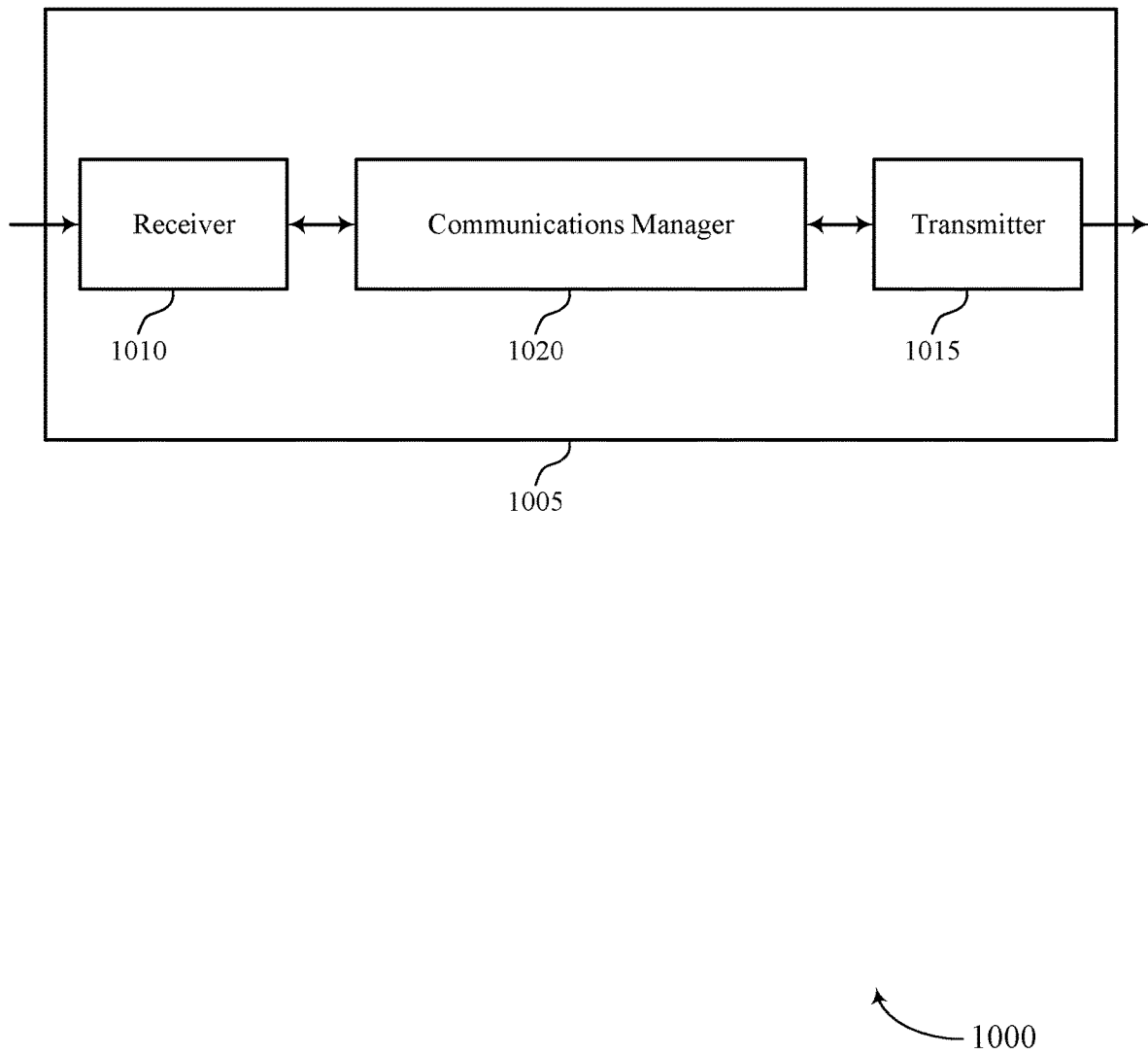
FIGS. 10 and 11 show block diagrams of devices that support techniques for network energy saving sequences and cell interaction in accordance with one or more aspects of the present disclosure.

FIG. 10 shows a block diagram 1000 of a device 1005 that supports techniques for network energy saving sequences and cell interaction in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for network energy saving sequences and cell interaction as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting, to a UE, first control signaling indicating a first network operation sequence associated with a first component carrier, the first network operation sequence including a first set of time intervals corresponding to a first set of network operation modes for the first component carrier. The communications manager 1020 may be configured as or otherwise support a means for transmitting, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The communications manager 1020 may be configured as or otherwise support a means for communicating with the UE via the first component carrier in accordance with the first network operation sequence. The communications manager 1020 may be configured as or otherwise support a means for communicating with the UE via the second component carrier in accordance with the second network operation sequence.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques that enable network entities 105 to implement network operation sequences on a component carrier-by-component carrier basis (e.g., cell-by-cell basis). As such, techniques described herein may enable network entities 105 to implement network operation sequences with a finer granularity as compared to some conventional techniques, and may thereby enable network entities to more efficiently and effectively support network traffic while simultaneously reducing power consumption. In particular, techniques described herein may be used to ensure that some minimum quantity of component carriers are able to support high data rates, while remaining component carriers may be operated in accordance with low power-consumption network operation sequences. As such, techniques described herein may enable the network to ensure that network traffic can be accommodated, while lowering the overall power consumption of the network.

Figure 11:
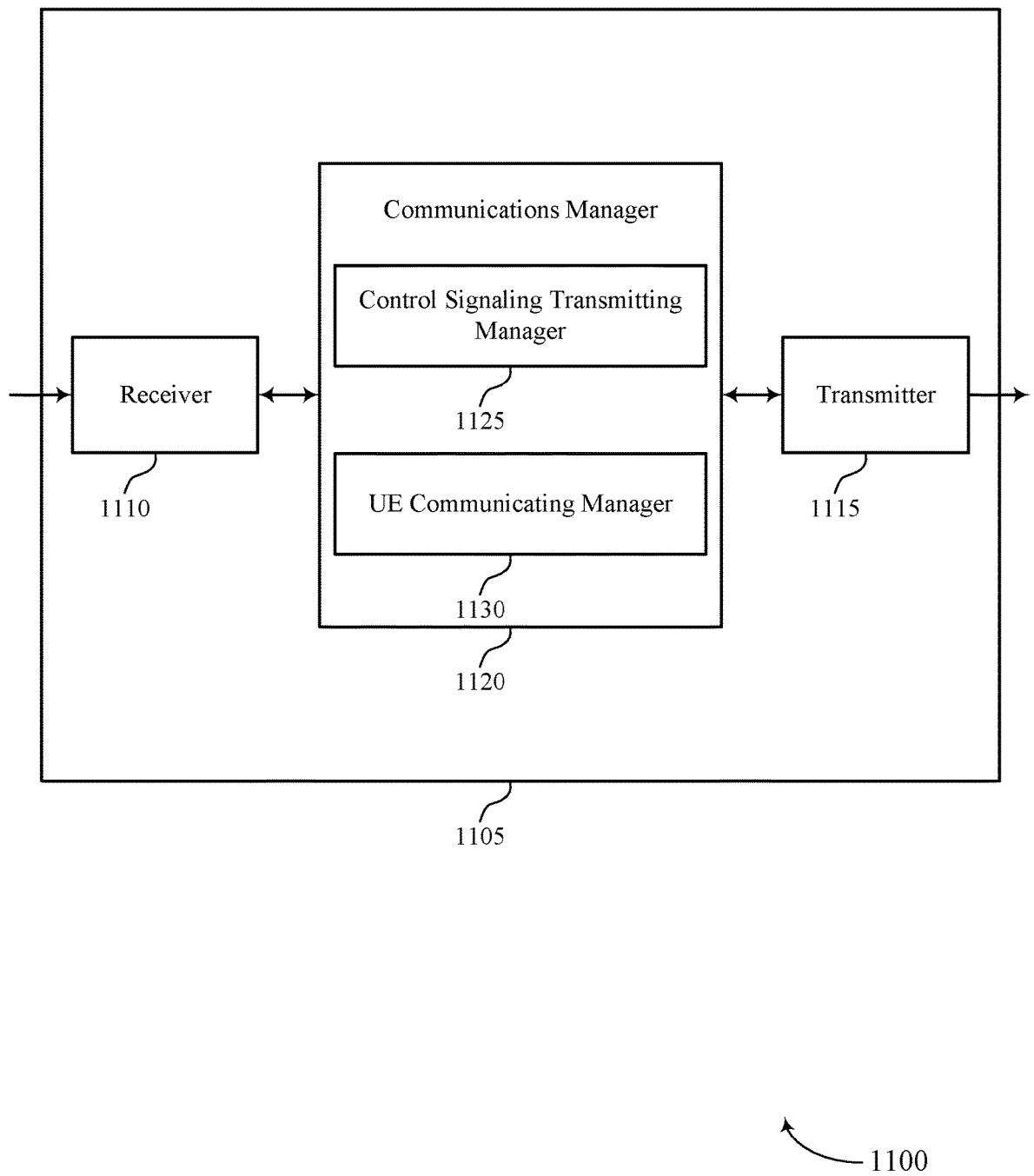

FIG. 11 shows a block diagram 1100 of a device 1105 that supports techniques for network energy saving sequences and cell interaction in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for network energy saving sequences and cell interaction as described herein. For example, the communications manager 1120 may include a control signaling transmitting manager 1125 a UE communicating manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The control signaling transmitting manager 1125 may be configured as or otherwise support a means for transmitting, to a UE, first control signaling indicating a first network operation sequence associated with a first component carrier, the first network operation sequence including a first set of time intervals corresponding to a first set of network operation modes for the first component carrier. The control signaling transmitting manager 1125 may be configured as or otherwise support a means for transmitting, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The UE communicating manager 1130 may be configured as or otherwise support a means for communicating with the UE via the first component carrier in accordance with the first network operation sequence. The UE communicating manager 1130 may be configured as or otherwise support a means for communicating with the UE via the second component carrier in accordance with the second network operation sequence.

Figure 12:
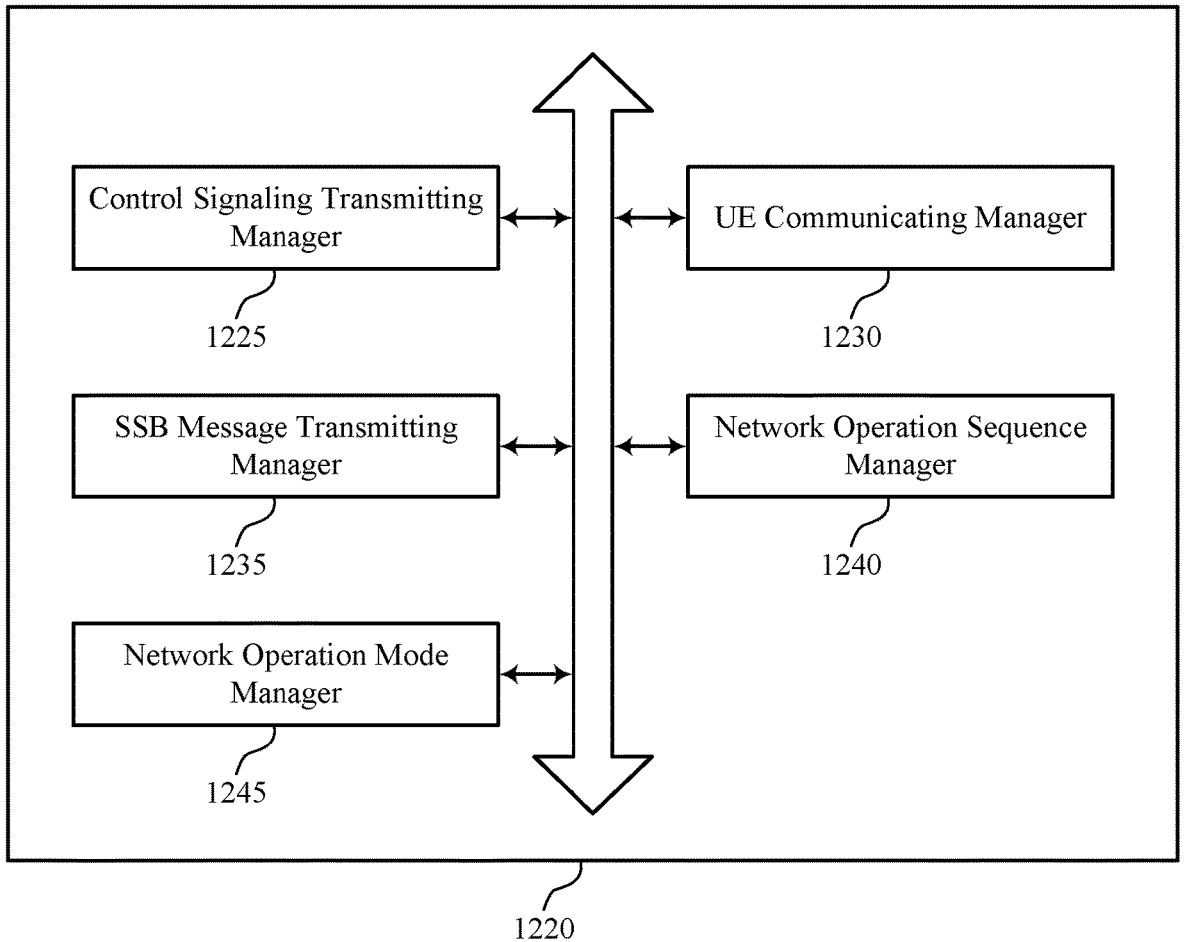
FIG. 12 shows a block diagram of a communications manager that supports techniques for network energy saving sequences and cell interaction in accordance with one or more aspects of the present disclosure.

FIG. 12 shows a block diagram 1200 of a communications manager 1220 that supports techniques for network energy saving sequences and cell interaction in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for network energy saving sequences and cell interaction as described herein. For example, the communications manager 1220 may include a control signaling transmitting manager 1225, a UE communicating manager 1230, an SSB message transmitting manager 1235, a network operation sequence manager 1240, a network operation mode manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The control signaling transmitting manager 1225 may be configured as or otherwise support a means for transmitting, to a UE, first control signaling indicating a first network operation sequence associated with a first component carrier, the first network operation sequence including a first set of time intervals corresponding to a first set of network operation modes for the first component carrier. In some examples, the control signaling transmitting manager 1225 may be configured as or otherwise support a means for transmitting, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The UE communicating manager 1230 may be configured as or otherwise support a means for communicating with the UE via the first component carrier in accordance with the first network operation sequence. In some examples, the UE communicating manager 1230 may be configured as or otherwise support a means for communicating with the UE via the second component carrier in accordance with the second network operation sequence.

In some examples, the first network operation sequence is configured for communicating SSB messages, and the SSB message transmitting manager 1235 may be configured as or otherwise support a means for transmitting one or more SSB messages to the UE via the first component carrier in accordance with the first network operation sequence.

In some examples, the control signaling transmitting manager 1225 may be configured as or otherwise support a means for transmitting, via the first control signaling, an indication of a set of multiple network operation sequences associated with the first component carrier, the set of multiple network operation sequences including the first network operation sequence and a third network operation sequence, the third network operation sequence including a third set of time intervals corresponding to a third set of network operation modes for the first component carrier. In some examples, the network operation sequence manager 1240 may be configured as or otherwise support a means for selecting the first network operation sequence from the set of multiple network operation sequences based on one or more parameters, a control message, or both, where communicating with the UE via the first component carrier in accordance with the first network operation sequence is based on the selecting.

In some examples, the network operation sequence manager 1240 may be configured as or otherwise support a means for transmitting, to the UE, a set of multiple network operation sequences associated with a set of multiple component carriers, the set of multiple network operation sequences including the first network operation sequence and the second network operation sequence, where the set of multiple network operation sequences include at least a threshold quantity of network operation sequences that are associated with a latency that satisfies a latency threshold, a data rate that satisfies a data rate threshold, or both. In some examples, the network operation sequence manager 1240 may be configured as or otherwise support a means for transmitting, to the UE, an indication of the threshold quantity of network operation sequences.

In some examples, where the first network operation sequence is associated with a first latency and a first data rate, where the first latency, the first data rate, or both, are determined based on a first identifier associated with the first network operation sequence, the first set of network operation modes, or both. In some examples, where the second network operation sequence is associated with a second latency and a second data rate, where the second latency, the second data rate, or both, are determined based on a second identifier associated with the second network operation sequence, the second set of network operation modes, or both.

In some examples, the control signaling transmitting manager 1225 may be configured as or otherwise support a means for transmitting, via the first control signaling, the second control signaling, or both, an indication of a first latency, a first data rate, or both, associated with the first network operation sequence, and an indication of a second latency, a second data rate, or both, associated with the second network operation sequence. In some examples, the control signaling transmitting manager 1225 may be configured as or otherwise support a means for transmitting, via the first control signaling, the second control signaling, or both, an indication of a first peak data rate associated with the first network operation sequence, and a second peak data rate associated with the second network operation sequence.

In some examples, the network operation sequence manager 1240 may be configured as or otherwise support a means for determining a time duration during which neither of the first network operation sequence or the second network operation sequence exhibits a data rate that satisfies a threshold data rate. In some examples, the network operation sequence manager 1240 may be configured as or otherwise support a means for determining, based on determining the time duration, a modified version of the second network operation sequence that exhibits an additional data rate throughout the time duration, where the additional data rate satisfies the threshold data rate, where communicating with the UE via the second component carrier includes communicating during the time duration in accordance with the modified version of the second network operation sequence.

In some examples, the network operation sequence manager 1240 may be configured as or otherwise support a means for determining a time duration during which neither of the first network operation sequence or the second network operation sequence exhibits a data rate that satisfies a threshold data rate and during which both the first network operation sequence and the second network operation sequence are associated with a power saving mode of the first and second sets of network operation modes. In some examples, the network operation sequence manager 1240 may be configured as or otherwise support a means for determining, based on determining the time duration, a modified version of the second network operation sequence, where the modified version of the second network operation sequence includes an inactive network operation mode throughout the time duration.

In some examples, the network operation mode manager 1245 may be configured as or otherwise support a means for comparing a first network operation mode of the first set of network operation modes and a second network operation mode of the second set of network operation modes based on the first network operation mode and the second network operation mode at least partially overlapping in a time domain. In some examples, the network operation mode manager 1245 may be configured as or otherwise support a means for determining a modified version of the first network operation mode, the second network operation mode, or both, based on the comparison and in accordance with a network sequence configuration, the network sequence configuration defining one or more conditions, one or more restrictions, or both, associated with network operation modes across the first component carrier and the second component carrier.

In some examples, the control signaling transmitting manager 1225 may be configured as or otherwise support a means for transmitting an indication of the network sequence configuration via the first control signaling, the second control signaling, additional control signaling, or any combination thereof.

In some examples, the first component carrier is associated with a PCell. In some examples, the second component carrier is associated with an SCell. In some examples, the first network operation sequence is associated with a first set of parameters. In some examples, the second network operation sequence is associated with a second set of parameters different from the first set of parameters. In some examples, the first set of parameters, the second set of parameters, or both, include a network energy consumption level, a maximum data rate, or both.

In some examples, the first control signaling is the same as the second control signaling. In some examples, the first set of network operation modes, the second set of network operation modes, or both, include a first network energy saving mode, a second network energy saving mode, a flexible mode, a legacy mode, an inactive mode, or any combination thereof.

Figure 13:
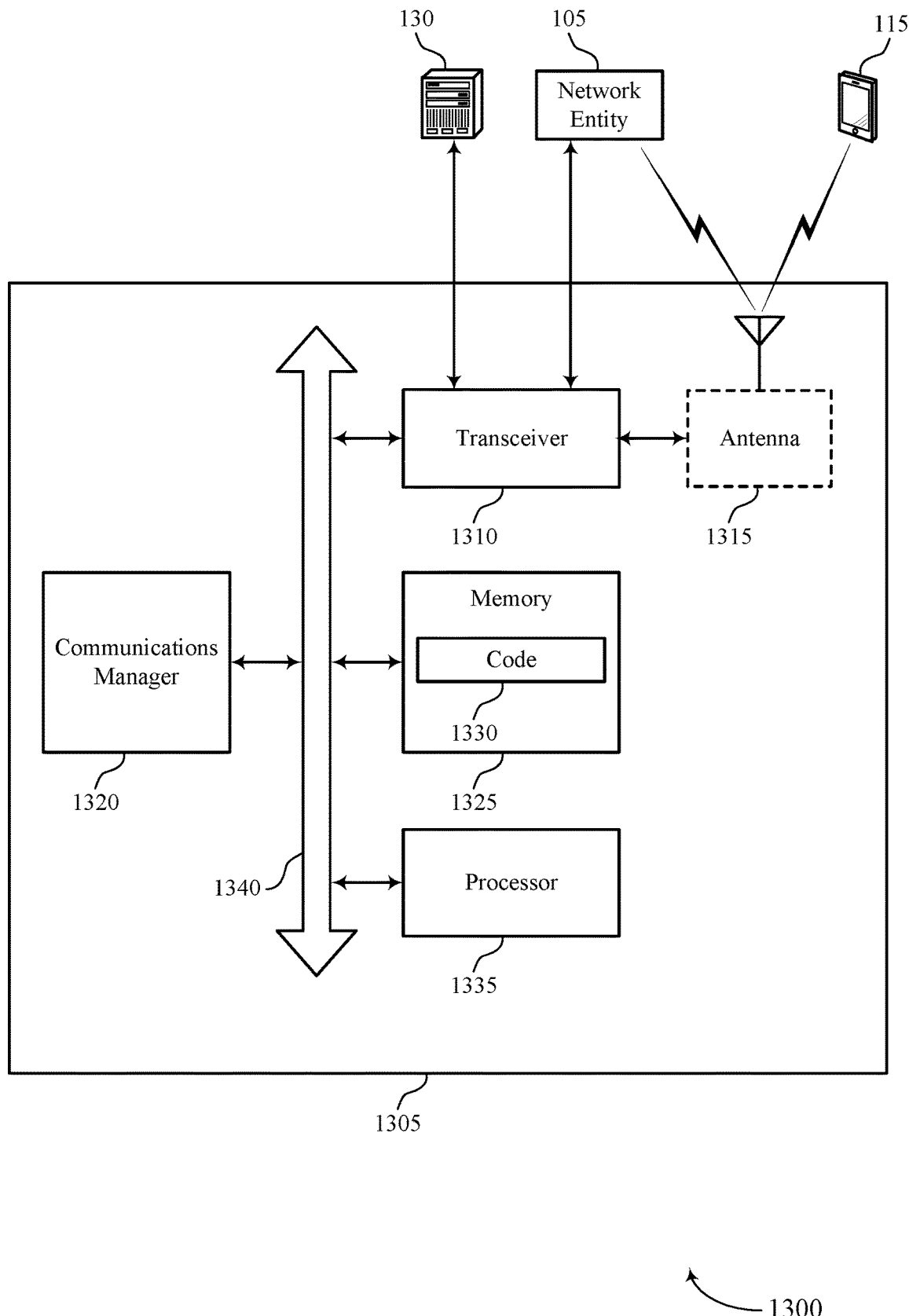
FIG. 13 shows a diagram of a system including a device that supports techniques for network energy saving sequences and cell interaction in accordance with one or more aspects of the present disclosure.

FIG. 13 shows a diagram of a system 1300 including a device 1305 that supports techniques for network energy saving sequences and cell interaction in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for network energy saving sequences and cell interaction). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting, to a UE, first control signaling indicating a first network operation sequence associated with a first component carrier, the first network operation sequence including a first set of time intervals corresponding to a first set of network operation modes for the first component carrier. The communications manager 1320 may be configured as or otherwise support a means for transmitting, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The communications manager 1320 may be configured as or otherwise support a means for communicating with the UE via the first component carrier in accordance with the first network operation sequence. The communications manager 1320 may be configured as or otherwise support a means for communicating with the UE via the second component carrier in accordance with the second network operation sequence.

By including or configuring the communications manager 1320 in accordance with examples as described herein, the device 1305 may support techniques that enable network entities 105 to implement network operation sequences on a component carrier-by-component carrier basis (e.g., cell-by-cell basis). As such, techniques described herein may enable network entities 105 to implement network operation sequences with a finer granularity as compared to some conventional techniques, and may thereby enable network entities to more efficiently and effectively support network traffic while simultaneously reducing power consumption. In particular, techniques described herein may be used to ensure that some minimum quantity of component carriers are able to support high data rates, while remaining component carriers may be operated in accordance with low power-consumption network operation sequences. As such, techniques described herein may enable the network to ensure that network traffic can be accommodated, while lowering the overall power consumption of the network.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of techniques for network energy saving sequences and cell interaction as described herein, or the processor 1335 and the memory 1325 may be otherwise configured to perform or support such operations.

Figure 14:
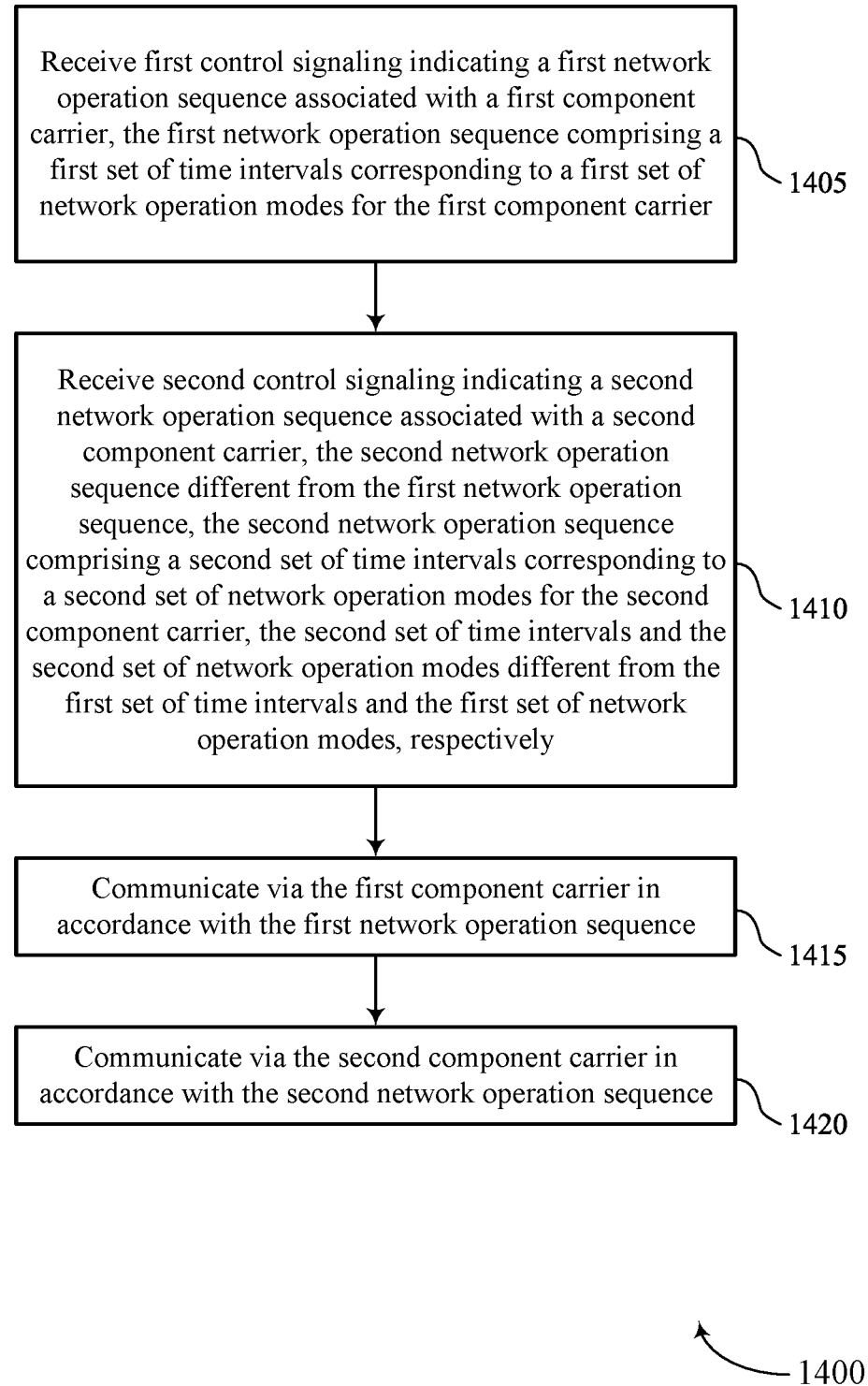
FIGS. 14 through 17 show flowcharts illustrating methods that support techniques for network energy saving sequences and cell interaction in accordance with one or more aspects of the present disclosure.

FIG. 14 shows a flowchart illustrating a method 1400 that supports techniques for network energy saving sequences and cell interaction in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving first control signaling indicating a first network operation sequence associated with a first component carrier, the first network operation sequence including a first set of time intervals corresponding to a first set of network operation modes for the first component carrier. The operations of 1405 may be performed in accordance with examples as disclosed herein. In some examples, aspects of the operations of 1405 may be performed by a control signaling receiving manager 825 as described with reference to FIG. 8.

At 1410, the method may include receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The operations of 1410 may be performed in accordance with examples as disclosed herein. In some examples, aspects of the operations of 1410 may be performed by a control signaling receiving manager 825 as described with reference to FIG. 8.

At 1415, the method may include communicating via the first component carrier in accordance with the first network operation sequence. The operations of 1415 may be performed in accordance with examples as disclosed herein. In some examples, aspects of the operations of 1415 may be performed by a network entity communicating manager 830 as described with reference to FIG. 8.

At 1420, the method may include communicating via the second component carrier in accordance with the second network operation sequence. The operations of 1420 may be performed in accordance with examples as disclosed herein. In some examples, aspects of the operations of 1420 may be performed by a network entity communicating manager 830 as described with reference to FIG. 8.

Figure 15:
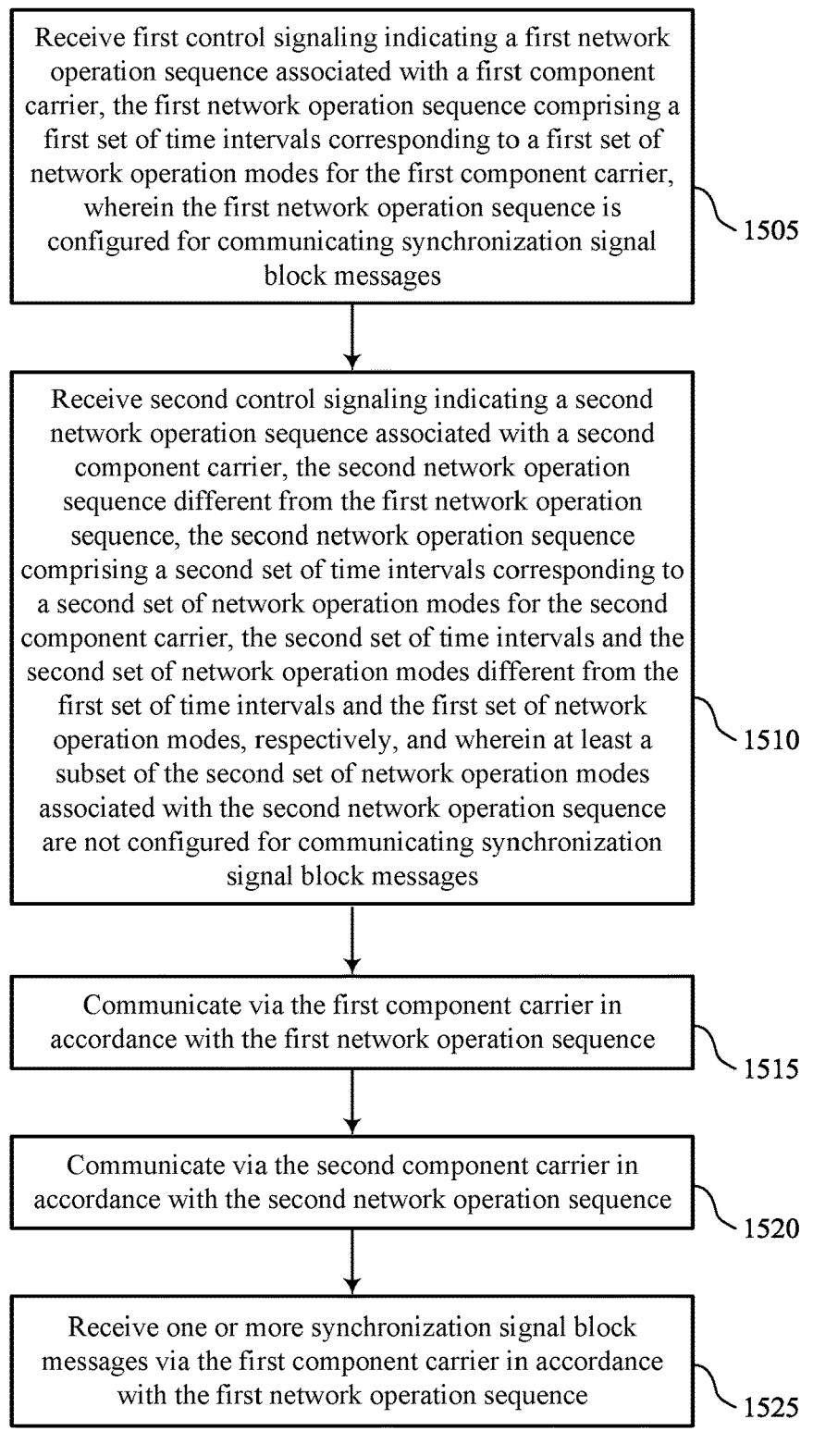

FIG. 15 shows a flowchart illustrating a method 1500 that supports techniques for network energy saving sequences and cell interaction in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving first control signaling indicating a first network operation sequence associated with a first component carrier, the first network operation sequence including a first set of time intervals corresponding to a first set of network operation modes for the first component carrier, and where the first network operation sequence is configured for communicating SSB messages. The operations of 1505 may be performed in accordance with examples as disclosed herein. In some examples, aspects of the operations of 1505 may be performed by a control signaling receiving manager 825 as described with reference to FIG. 8.

At 1510, the method may include receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively, and where at least a subset of the second set of network operation modes associated with the second network operation sequence are not configured for communicating SSB messages. The operations of 1510 may be performed in accordance with examples as disclosed herein. In some examples, aspects of the operations of 1510 may be performed by a control signaling receiving manager 825 as described with reference to FIG. 8.

At 1515, the method may include communicating via the first component carrier in accordance with the first network operation sequence. The operations of 1515 may be performed in accordance with examples as disclosed herein. In some examples, aspects of the operations of 1515 may be performed by a network entity communicating manager 830 as described with reference to FIG. 8.

At 1520, the method may include communicating via the second component carrier in accordance with the second network operation sequence. The operations of 1520 may be performed in accordance with examples as disclosed herein. In some examples, aspects of the operations of 1520 may be performed by a network entity communicating manager 830 as described with reference to FIG. 8.

At 1525, the method may include receiving one or more SSB messages via the first component carrier in accordance with the first network operation sequence. The operations of 1525 may be performed in accordance with examples as disclosed herein. In some examples, aspects of the operations of 1525 may be performed by an SSB message receiving manager 835 as described with reference to FIG. 8.

Figure 16:
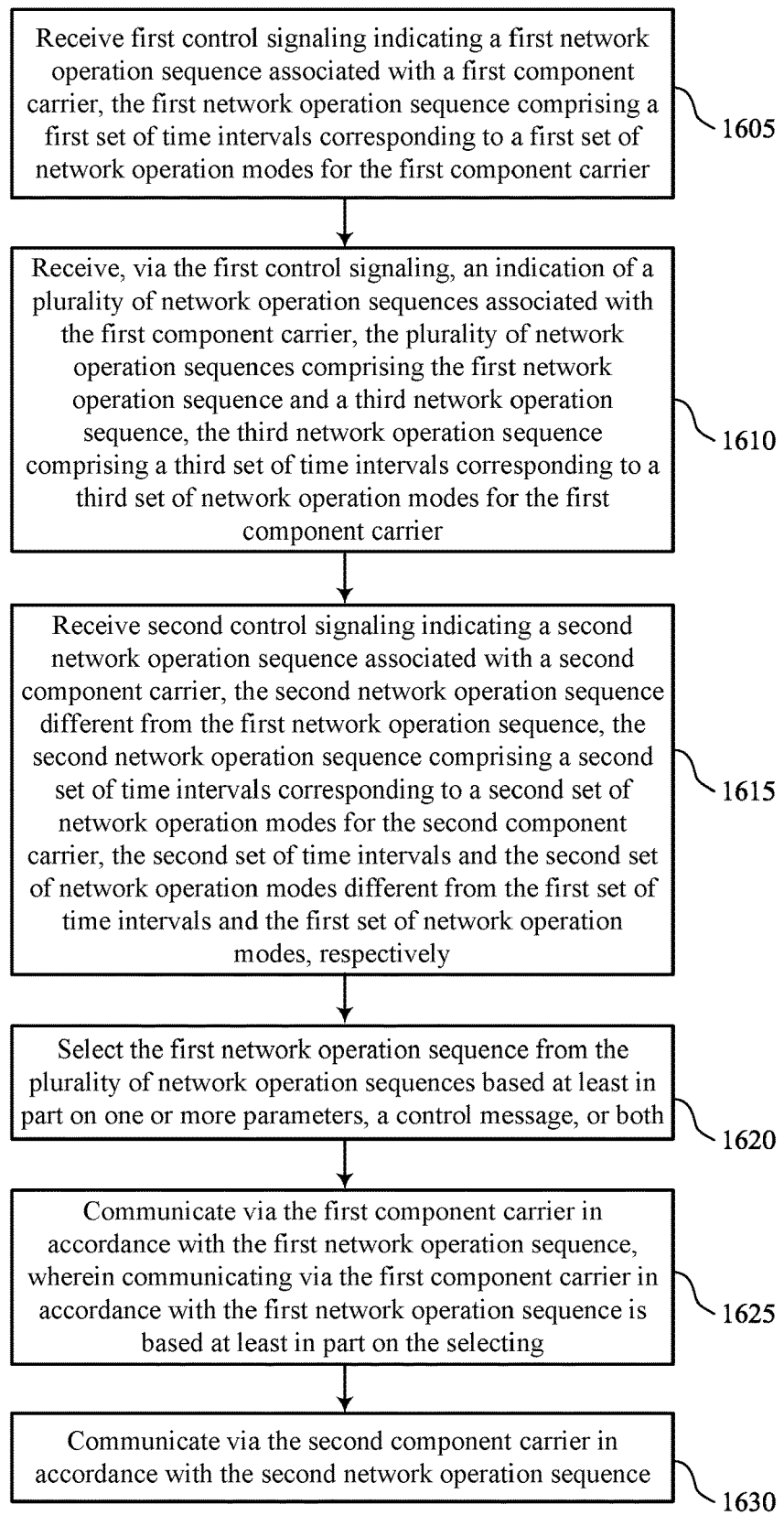

FIG. 16 shows a flowchart illustrating a method 1600 that supports techniques for network energy saving sequences and cell interaction in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving first control signaling indicating a first network operation sequence associated with a first component carrier, the first network operation sequence including a first set of time intervals corresponding to a first set of network operation modes for the first component carrier. The operations of 1605 may be performed in accordance with examples as disclosed herein. In some examples, aspects of the operations of 1605 may be performed by a control signaling receiving manager 825 as described with reference to FIG. 8.

At 1610, the method may include receiving, via the first control signaling, an indication of a set of multiple network operation sequences associated with the first component carrier, the set of multiple network operation sequences including the first network operation sequence and a third network operation sequence, the third network operation sequence including a third set of time intervals corresponding to a third set of network operation modes for the first component carrier. The operations of 1610 may be performed in accordance with examples as disclosed herein. In some examples, aspects of the operations of 1610 may be performed by a control signaling receiving manager 825 as described with reference to FIG. 8.

At 1615, the method may include receiving second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The operations of 1615 may be performed in accordance with examples as disclosed herein. In some examples, aspects of the operations of 1615 may be performed by a control signaling receiving manager 825 as described with reference to FIG. 8.

At 1620, the method may include selecting the first network operation sequence from the set of multiple network operation sequences based on one or more parameters, a control message, or both. The operations of 1620 may be performed in accordance with examples as disclosed herein. In some examples, aspects of the operations of 1620 may be performed by a network operation sequence manager 840 as described with reference to FIG. 8.

At 1625, the method may include communicating via the first component carrier in accordance with the first network operation sequence, where communicating via the first component carrier in accordance with the first network operation sequence is based on the selecting. The operations of 1625 may be performed in accordance with examples as disclosed herein. In some examples, aspects of the operations of 1625 may be performed by a network entity communicating manager 830 as described with reference to FIG. 8.

At 1630, the method may include communicating via the second component carrier in accordance with the second network operation sequence. The operations of 1630 may be performed in accordance with examples as disclosed herein. In some examples, aspects of the operations of 1630 may be performed by a network entity communicating manager 830 as described with reference to FIG. 8.

Figure 17:
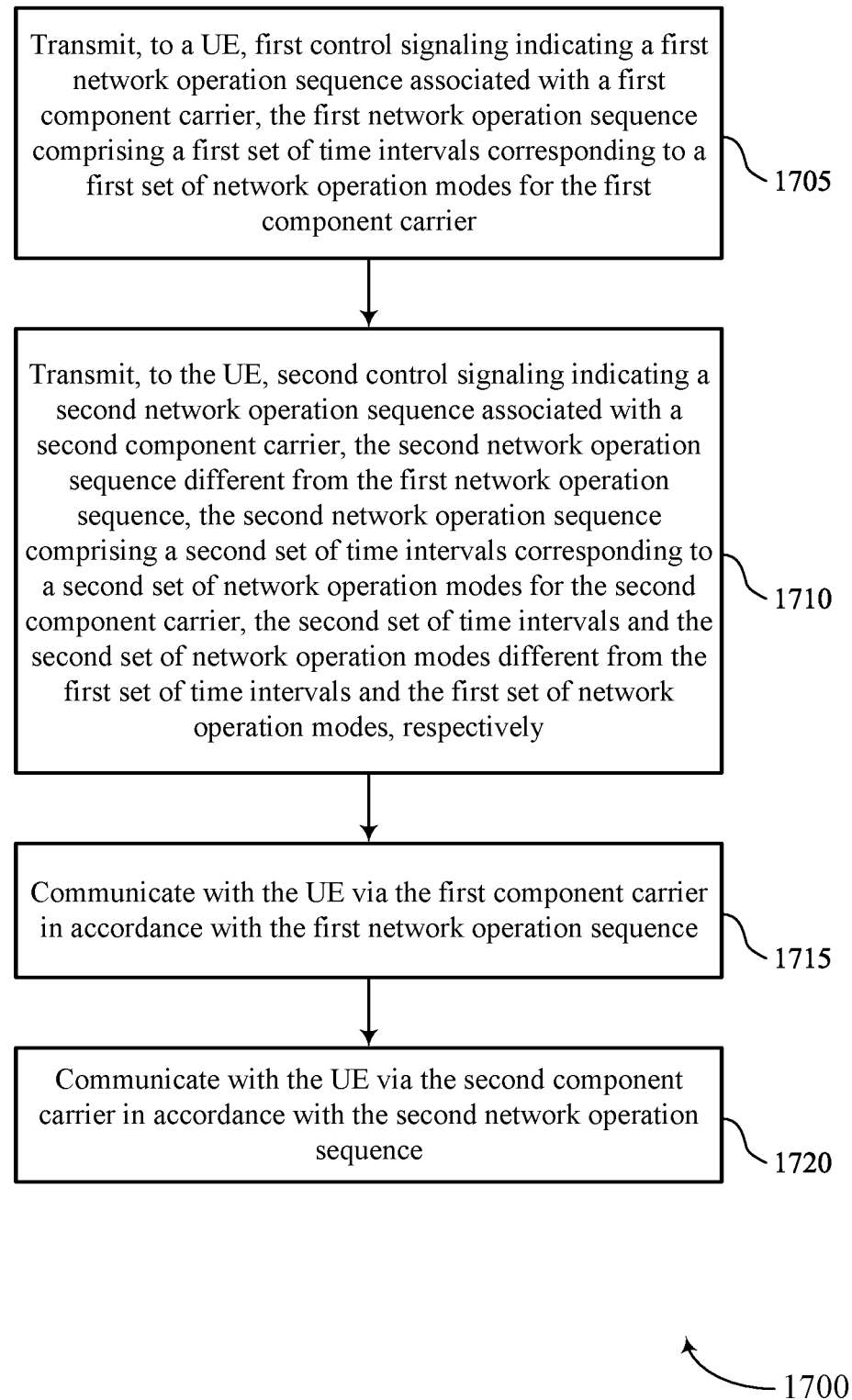

FIG. 17 shows a flowchart illustrating a method 1700 that supports techniques for network energy saving sequences and cell interaction in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, first control signaling indicating a first network operation sequence associated with a first component carrier, the first network operation sequence including a first set of time intervals corresponding to a first set of network operation modes for the first component carrier. The operations of 1705 may be performed in accordance with examples as disclosed herein. In some examples, aspects of the operations of 1705 may be performed by a control signaling transmitting manager 1225 as described with reference to FIG. 12.

At 1710, the method may include transmitting, to the UE, second control signaling indicating a second network operation sequence associated with a second component carrier, the second network operation sequence different from the first network operation sequence, the second network operation sequence including a second set of time intervals corresponding to a second set of network operation modes for the second component carrier, the second set of time intervals and the second set of network operation modes different from the first set of time intervals and the first set of network operation modes, respectively. The operations of 1710 may be performed in accordance with examples as disclosed herein. In some examples, aspects of the operations of 1710 may be performed by a control signaling transmitting manager 1225 as described with reference to FIG. 12.

At 1715, the method may include communicating with the UE via the first component carrier in accordance with the first network operation sequence. The operations of 1715 may be performed in accordance with examples as disclosed herein. In some examples, aspects of the operations of 1715 may be performed by a UE communicating manager 1230 as described with reference to FIG. 12.

At 1720, the method may include communicating with the UE via the second component carrier in accordance with the second network operation sequence. The operations of 1720 may be performed in accordance with examples as disclosed herein. In some examples, aspects of the operations of 1720 may be performed by a UE communicating manager 1230 as described with reference to FIG. 12.

The following provides an overview of aspects of the present disclosure:

Aspect 1: A method for wireless communication at a UE, comprising: receiving first control signaling indicating a first network operation sequence associated with a first component carrier, the first network operation sequence comprising a first set of time intervals corresponding to a first set of network operation modes for the first component carrier; receiving second control signaling indicating a second network operation sequence associated with a second component carrier, the second network operation sequence different from the first network operation sequence, the second network operation sequence comprising a second set of time intervals corresponding to a second set of network operation modes for the second component carrier, the second set of time intervals and the second set of network operation modes different from the first set of time intervals and the first set of network operation modes, respectively; communicating via the first component carrier in accordance with the first network operation sequence; and communicating via the second component carrier in accordance with the second network operation sequence.

Aspect 2: The method of aspect 1, wherein the first network operation sequence is configured for communicating SSB messages, and wherein at least a subset of the second set of network operation modes associated with the second network operation sequence are not configured for communicating SSB messages, the method further comprising: receiving one or more SSB messages via the first component carrier in accordance with the first network operation sequence.

Aspect 3: The method of any of aspects 1 through 2, further comprising: receiving, via the first control signaling, an indication of a plurality of network operation sequences associated with the first component carrier, the plurality of network operation sequences comprising the first network operation sequence and a third network operation sequence, the third network operation sequence comprising a third set of time intervals corresponding to a third set of network operation modes for the first component carrier; and selecting the first network operation sequence from the plurality of network operation sequences based at least in part on one or more parameters, a control message, or both, wherein communicating via the first component carrier in accordance with the first network operation sequence is based at least in part on the selecting.

Aspect 4: The method of any of aspects 1 through 3, further comprising: receiving a plurality of network operation sequences associated with a plurality of component carriers, the plurality of network operation sequences comprising the first network operation sequence and the second network operation sequence, wherein the plurality of network operation sequences comprise at least a threshold quantity of network operation sequences that are associated with a latency that satisfies a latency threshold, a data rate that satisfies a data rate threshold, or both.

Aspect 5: The method of aspect 4, further comprising: receiving an indication of the threshold quantity of network operation sequences.

Aspect 6: The method of any of aspects 1 through 5, wherein the first network operation sequence is associated with a first latency and a first data rate, wherein the first latency, the first data rate, or both, are determined based at least in part on a first identifier associated with the first network operation sequence, the first set of network operation modes, or both, and wherein the second network operation sequence is associated with a second latency and a second data rate, wherein the second latency, the second data rate, or both, are determined based at least in part on a second identifier associated with the second network operation sequence, the second set of network operation modes, or both.

Aspect 7: The method of any of aspects 1 through 6, further comprising: receiving, via the first control signaling, the second control signaling, or both, an indication of a first latency, a first data rate, or both, associated with the first network operation sequence, and an indication of a second latency, a second data rate, or both, associated with the second network operation sequence.

Aspect 8: The method of any of aspects 1 through 7, further comprising: receiving, via the first control signaling, the second control signaling, or both, an indication of a first peak data rate associated with the first network operation sequence, and a second peak data rate associated with the second network operation sequence.

Aspect 9: The method of any of aspects 1 through 8, further comprising: determining a time duration during which neither of the first network operation sequence or the second network operation sequence exhibits a data rate that satisfies a threshold data rate; and determining, based at least in part on determining the time duration, a modified version of the second network operation sequence that exhibits an additional data rate throughout the time duration, wherein the additional data rate satisfies the threshold data rate, wherein communicating via the second component carrier comprises communicating during the time duration in accordance with the modified version of the second network operation sequence.

Aspect 10: The method of any of aspects 1 through 9, further comprising: determining a time duration during which neither of the first network operation sequence or the second network operation sequence exhibits a data rate that satisfies a threshold data rate and during which both the first network operation sequence and the second network operation sequence are associated with a power saving mode of the first and second sets of network operation modes; and determining, based at least in part on determining the time duration, a modified version of the second network operation sequence, wherein the modified version of the second network operation sequence comprises an inactive network operation mode throughout the time duration.

Aspect 11: The method of any of aspects 1 through 10, further comprising: comparing a first network operation mode of the first set of network operation modes and a second network operation mode of the second set of network operation modes based at least in part on the first network operation mode and the second network operation mode at least partially overlapping in a time domain; and determining a modified version of the first network operation mode, the second network operation mode, or both, based at least in part on the comparison and in accordance with a network sequence configuration, the network sequence configuration defining one or more conditions, one or more restrictions, or both, associated with network operation modes across the first component carrier and the second component carrier.

Aspect 12: The method of aspect 11, further comprising: receiving an indication of the network sequence configuration via the first control signaling, the second control signaling, additional control signaling, or any combination thereof, wherein comparing the first network operation mode and the second network operation mode, determining the modified version, or both, is based at least in part on receiving the network sequence configuration.

Aspect 13: The method of any of aspects 1 through 12, wherein the first component carrier is associated with a PCell, and the second component carrier is associated with an SCell.

Aspect 14: The method of any of aspects 1 through 13, wherein the first network operation sequence is associated with a first set of parameters, and the second network operation sequence is associated with a second set of parameters different from the first set of parameters, the first set of parameters, the second set of parameters, or both, comprise a network energy consumption level, a maximum data rate, or both.

Aspect 15: The method of any of aspects 1 through 14, wherein the first control signaling is the same as the second control signaling.

Aspect 16: The method of any of aspects 1 through 15, wherein the first set of network operation modes, the second set of network operation modes, or both, comprise a first network energy saving mode, a second network energy saving mode, a flexible mode, a legacy mode, an inactive mode, or any combination thereof.

Aspect 17: A method for wireless communication at a network entity, comprising: transmitting, to a UE, first control signaling indicating a first network operation sequence associated with a first component carrier, the first network operation sequence comprising a first set of time intervals corresponding to a first set of network operation modes for the first component carrier; transmitting, to the UE, second control signaling indicating a second network operation sequence associated with a second component carrier, the second network operation sequence different from the first network operation sequence, the second network operation sequence comprising a second set of time intervals corresponding to a second set of network operation modes for the second component carrier, the second set of time intervals and the second set of network operation modes different from the first set of time intervals and the first set of network operation modes, respectively; communicating with the UE via the first component carrier in accordance with the first network operation sequence; and communicating with the UE via the second component carrier in accordance with the second network operation sequence.

Aspect 18: The method of aspect 17, wherein the first network operation sequence is configured for communicating SSB messages, and wherein at least a subset of the second set of network operation modes associated with the second network operation sequence are not configured for communicating SSB messages, the method further comprising: transmitting one or more SSB messages to the UE via the first component carrier in accordance with the first network operation sequence.

Aspect 19: The method of any of aspects 17 through 18, further comprising: transmitting, via the first control signaling, an indication of a plurality of network operation sequences associated with the first component carrier, the plurality of network operation sequences comprising the first network operation sequence and a third network operation sequence, the third network operation sequence comprising a third set of time intervals corresponding to a third set of network operation modes for the first component carrier; and selecting the first network operation sequence from the plurality of network operation sequences based at least in part on one or more parameters, a control message, or both, wherein communicating with the UE via the first component carrier in accordance with the first network operation sequence is based at least in part on the selecting.

Aspect 20: The method of any of aspects 17 through 19, further comprising: transmitting, to the UE, a plurality of network operation sequences associated with a plurality of component carriers, the plurality of network operation sequences comprising the first network operation sequence and the second network operation sequence, wherein the plurality of network operation sequences comprise at least a threshold quantity of network operation sequences that are associated with a latency that satisfies a latency threshold, a data rate that satisfies a data rate threshold, or both.

Aspect 21: The method of aspect 20, further comprising: transmitting, to the UE, an indication of the threshold quantity of network operation sequences.

Aspect 22: The method of any of aspects 17 through 21, wherein the first network operation sequence is associated with a first latency and a first data rate, wherein the first latency, the first data rate, or both, are determined based at least in part on a first identifier associated with the first network operation sequence, the first set of network operation modes, or both, and wherein the second network operation sequence is associated with a second latency and a second data rate, wherein the second latency, the second data rate, or both, are determined based at least in part on a second identifier associated with the second network operation sequence, the second set of network operation modes, or both.

Aspect 23: The method of any of aspects 17 through 22, further comprising: transmitting, via the first control signaling, the second control signaling, or both, an indication of a first latency, a first data rate, or both, associated with the first network operation sequence, and an indication of a second latency, a second data rate, or both, associated with the second network operation sequence.

Aspect 24: The method of any of aspects 17 through 23, further comprising: transmitting, via the first control signaling, the second control signaling, or both, an indication of a first peak data rate associated with the first network operation sequence, and a second peak data rate associated with the second network operation sequence.

Aspect 25: The method of any of aspects 17 through 24, further comprising: determining a time duration during which neither of the first network operation sequence or the second network operation sequence exhibits a data rate that satisfies a threshold data rate; and determining, based at least in part on determining the time duration, a modified version of the second network operation sequence that exhibits an additional data rate throughout the time duration, wherein the additional data rate satisfies the threshold data rate, wherein communicating with the UE via the second component carrier comprises communicating during the time duration in accordance with the modified version of the second network operation sequence.

Aspect 26: The method of any of aspects 17 through 25, further comprising: determining a time duration during which neither of the first network operation sequence or the second network operation sequence exhibits a data rate that satisfies a threshold data rate and during which both the first network operation sequence and the second network operation sequence are associated with a power saving mode of the first and second sets of network operation modes; and determining, based at least in part on determining the time duration, a modified version of the second network operation sequence, wherein the modified version of the second network operation sequence comprises an inactive network operation mode throughout the time duration.

Aspect 27: The method of any of aspects 17 through 26, further comprising: comparing a first network operation mode of the first set of network operation modes and a second network operation mode of the second set of network operation modes based at least in part on the first network operation mode and the second network operation mode at least partially overlapping in a time domain; and determining a modified version of the first network operation mode, the second network operation mode, or both, based at least in part on the comparison and in accordance with a network sequence configuration, the network sequence configuration defining one or more conditions, one or more restrictions, or both, associated with network operation modes across the first component carrier and the second component carrier.

Aspect 28: The method of aspect 27, further comprising: transmitting an indication of the network sequence configuration via the first control signaling, the second control signaling, additional control signaling, or any combination thereof.

Aspect 29: The method of any of aspects 17 through 28, wherein the first component carrier is associated with a PCell, and the second component carrier is associated with an SCell.

Aspect 30: The method of any of aspects 17 through 29, wherein the first network operation sequence is associated with a first set of parameters, and the second network operation sequence is associated with a second set of parameters different from the first set of parameters, the first set of parameters, the second set of parameters, or both, comprise a network energy consumption level, a maximum data rate, or both.

Aspect 31: The method of any of aspects 17 through 30, wherein the first control signaling is the same as the second control signaling.

Aspect 32: The method of any of aspects 17 through 31, wherein the first set of network operation modes, the second set of network operation modes, or both, comprise a first network energy saving mode, a second network energy saving mode, a flexible mode, a legacy mode, an inactive mode, or any combination thereof.

Aspect 33: An apparatus comprising a processor; memory coupled with the processor; and instructions stored in the memory and executable by the processor to cause the apparatus to perform a method of any of aspects 1 through 16.

Aspect 34: An apparatus comprising at least one means for performing a method of any of aspects 1 through 16.

Aspect 35: A non-transitory computer-readable medium storing code the code comprising instructions executable by a processor to perform a method of any of aspects 1 through 16.

Aspect 36: An apparatus for wireless communication at a network entity, comprising a processor; memory coupled with the processor; and instructions stored in the memory and executable by the processor to cause the apparatus to perform a method of any of aspects 17 through 32.

Aspect 37: An apparatus for wireless communication at a network entity, comprising at least one means for performing a method of any of aspects 17 through 32.

Aspect 38: A non-transitory computer-readable medium storing code for wireless communication at a network entity, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving first control signaling indicating a first network operation sequence implemented by one or more network entities for performing communications via a first component carrier, the first network operation sequence comprising a first set of time intervals corresponding to a first set of network operation modes for the first component carrier;
   receiving second control signaling indicating a second network operation sequence implemented by the one or more network entities for performing communications via a second component carrier, the second network operation sequence different from the first network operation sequence, the second network operation sequence comprising a second set of time intervals corresponding to a second set of network operation modes for the second component carrier, the second set of time intervals and the second set of network operation modes different from the first set of time intervals and the first set of network operation modes, respectively;
   communicating via the first component carrier in accordance with the first network operation sequence; and
   communicating via the second component carrier in accordance with the second network operation sequence.

2. The method of claim 1, wherein the first network operation sequence is configured for communicating synchronization signal block messages, and wherein at least a subset of the second set of network operation modes associated with the second network operation sequence are not configured for communicating synchronization signal block messages, the method further comprising:
   receiving one or more synchronization signal block messages via the first component carrier in accordance with the first network operation sequence.

3. The method of claim 1, further comprising:
   receiving, via the first control signaling, an indication of a plurality of network operation sequences associated with the first component carrier, the plurality of network operation sequences comprising the first network operation sequence and a third network operation sequence, the third network operation sequence comprising a third set of time intervals corresponding to a third set of network operation modes for the first component carrier; and
   selecting the first network operation sequence from the plurality of network operation sequences based at least in part on one or more parameters, a control message, or both, wherein communicating via the first component carrier in accordance with the first network operation sequence is based at least in part on the selecting.

4. The method of claim 1, further comprising:
   receiving a plurality of network operation sequences associated with a plurality of component carriers, the plurality of network operation sequences comprising the first network operation sequence and the second network operation sequence, wherein the plurality of network operation sequences comprise at least a threshold quantity of network operation sequences that are associated with a latency that satisfies a latency threshold, a data rate that satisfies a data rate threshold, or both.

5. The method of claim 4, further comprising:
   receiving an indication of the threshold quantity of network operation sequences.

6. The method of claim 1,
   wherein the first network operation sequence is associated with a first latency and a first data rate, wherein the first latency, the first data rate, or both, are determined based at least in part on a first identifier associated with the first network operation sequence, the first set of network operation modes, or both, and
   wherein the second network operation sequence is associated with a second latency and a second data rate, wherein the second latency, the second data rate, or both, are determined based at least in part on a second identifier associated with the second network operation sequence, the second set of network operation modes, or both.

7. The method of claim 1, further comprising:
   receiving, via the first control signaling, the second control signaling, or both, an indication of a first latency, a first data rate, or both, associated with the first network operation sequence, and an indication of a second latency, a second data rate, or both, associated with the second network operation sequence.

8. The method of claim 1, further comprising:
receiving, via the first control signaling, the second control signaling, or both, an indication of a first peak data rate associated with the first network operation sequence, and a second peak data rate associated with the second network operation sequence.

9. The method of claim 1, further comprising:
determining a time duration during which neither of the first network operation sequence or the second network operation sequence exhibits a data rate that satisfies a threshold data rate; and
determining, based at least in part on determining the time duration, a modified version of the second network operation sequence that exhibits an additional data rate throughout the time duration, wherein the additional data rate satisfies the threshold data rate, wherein communicating via the second component carrier comprises communicating during the time duration in accordance with the modified version of the second network operation sequence.

10. The method of claim 1, further comprising:
determining a time duration during which neither of the first network operation sequence or the second network operation sequence exhibits a data rate that satisfies a threshold data rate and during which both the first network operation sequence and the second network operation sequence are associated with a power saving mode of the first and second sets of network operation modes; and
determining, based at least in part on determining the time duration, a modified version of the second network operation sequence, wherein the modified version of the second network operation sequence comprises an inactive network operation mode throughout the time duration.

11. The method of claim 1, further comprising:
comparing a first network operation mode of the first set of network operation modes and a second network operation mode of the second set of network operation modes based at least in part on the first network operation mode and the second network operation mode at least partially overlapping in a time domain; and
determining a modified version of the first network operation mode, the second network operation mode, or both, based at least in part on the comparison and in accordance with a network sequence configuration, the network sequence configuration defining one or more conditions, one or more restrictions, or both, associated with network operation modes across the first component carrier and the second component carrier.

12. The method of claim 11, further comprising:
receiving an indication of the network sequence configuration via the first control signaling, the second control signaling, additional control signaling, or any combination thereof, wherein comparing the first network operation mode and the second network operation mode, determining the modified version, or both, is based at least in part on receiving the network sequence configuration.

13. The method of claim 1, wherein the first component carrier is associated with a primary cell, and wherein the second component carrier is associated with a secondary cell.

14. The method of claim 1, wherein the first network operation sequence is associated with a first set of parameters, and wherein the second network operation sequence is associated with a second set of parameters different from the first set of parameters, wherein the first set of parameters, the second set of parameters, or both, comprise a network energy consumption level, a maximum data rate, or both.

15. The method of claim 1, wherein the first control signaling is the same as the second control signaling.

16. The method of claim 1, wherein the first set of network operation modes, the second set of network operation modes, or both, comprise a first network energy saving mode, a second network energy saving mode, a flexible mode, a legacy mode, an inactive mode, or any combination thereof.

17. A method for wireless communication at a network entity, comprising:
transmitting, to a user equipment (UE), first control signaling indicating a first network operation sequence implemented by the network entity for performing communications via a first component carrier, the first network operation sequence comprising a first set of time intervals corresponding to a first set of network operation modes for the first component carrier;
transmitting, to the UE, second control signaling indicating a second network operation sequence implemented by the network entity for performing communications via a second component carrier, the second network operation sequence different from the first network operation sequence, the second network operation sequence comprising a second set of time intervals corresponding to a second set of network operation modes for the second component carrier, the second set of time intervals and the second set of network operation modes different from the first set of time intervals and the first set of network operation modes, respectively;
communicating with the UE via the first component carrier in accordance with the first network operation sequence; and
communicating with the UE via the second component carrier in accordance with the second network operation sequence.

18. The method of claim 17, wherein the first network operation sequence is configured for communicating synchronization signal block messages, and wherein at least a subset of the second set of network operation modes associated with the second network operation sequence are not configured for communicating synchronization signal block messages, the method further comprising:
transmitting one or more synchronization signal block messages to the UE via the first component carrier in accordance with the first network operation sequence.

19. The method of claim 17, further comprising:
transmitting, via the first control signaling, an indication of a plurality of network operation sequences associated with the first component carrier, the plurality of network operation sequences comprising the first network operation sequence and a third network operation sequence, the third network operation sequence comprising a third set of time intervals corresponding to a third set of network operation modes for the first component carrier; and selecting the first network operation sequence from the plurality of network operation sequences based at least in part on one or more parameters, a control message, or both, wherein communicating with the UE via the first component carrier in accordance with the first network operation sequence is based at least in part on the selecting.

20. The method of claim 17, further comprising:
transmitting, to the UE, a plurality of network operation sequences associated with a plurality of component carriers, the plurality of network operation sequences comprising the first network operation sequence and the second network operation sequence, wherein the plurality of network operation sequences comprise at least a threshold quantity of network operation sequences that are associated with a latency that satisfies a latency threshold, a data rate that satisfies a data rate threshold, or both.

21. The method of claim 20, further comprising:
transmitting, to the UE, an indication of the threshold quantity of network operation sequences.

22. The method of claim 17,
wherein the first network operation sequence is associated with a first latency and a first data rate, wherein the first latency, the first data rate, or both, are determined based at least in part on a first identifier associated with the first network operation sequence, the first set of network operation modes, or both, and
wherein the second network operation sequence is associated with a second latency and a second data rate, wherein the second latency, the second data rate, or both, are determined based at least in part on a second identifier associated with the second network operation sequence, the second set of network operation modes, or both.

23. The method of claim 17, further comprising:
transmitting, via the first control signaling, the second control signaling, or both, an indication of a first latency, a first data rate, or both, associated with the first network operation sequence, and an indication of a second latency, a second data rate, or both, associated with the second network operation sequence.

24. The method of claim 17, further comprising:
transmitting, via the first control signaling, the second control signaling, or both, an indication of a first peak data rate associated with the first network operation sequence, and a second peak data rate associated with the second network operation sequence.

25. The method of claim 17, further comprising:
determining a time duration during which neither of the first network operation sequence or the second network operation sequence exhibits a data rate that satisfies a threshold data rate; and
determining, based at least in part on determining the time duration, a modified version of the second network operation sequence that exhibits an additional data rate throughout the time duration, wherein the additional data rate satisfies the threshold data rate, wherein communicating with the UE via the second component carrier comprises communicating during the time duration in accordance with the modified version of the second network operation sequence.

26. The method of claim 17, further comprising:
determining a time duration during which neither of the first network operation sequence or the second network operation sequence exhibits a data rate that satisfies a threshold data rate and during which both the first network operation sequence and the second network operation sequence are associated with a power saving mode of the first and second sets of network operation modes; and
determining, based at least in part on determining the time duration, a modified version of the second network operation sequence, wherein the modified version of the second network operation sequence comprises an inactive network operation mode throughout the time duration.

27. The method of claim 17, further comprising:
comparing a first network operation mode of the first set of network operation modes and a second network operation mode of the second set of network operation modes based at least in part on the first network operation mode and the second network operation mode at least partially overlapping in a time domain; and
determining a modified version of the first network operation mode, the second network operation mode, or both, based at least in part on the comparison and in accordance with a network sequence configuration, the network sequence configuration defining one or more conditions, one or more restrictions, or both, associated with network operation modes across the first component carrier and the second component carrier.

28. The method of claim 27, further comprising:
transmitting an indication of the network sequence configuration via the first control signaling, the second control signaling, additional control signaling, or any combination thereof.

29. The method of claim 17, wherein the first component carrier is associated with a primary cell, and wherein the second component carrier is associated with a secondary cell.

30. The method of claim 17, wherein the first network operation sequence is associated with a first set of parameters, and wherein the second network operation sequence is associated with a second set of parameters different from the first set of parameters, wherein the first set of parameters, the second set of parameters, or both, comprise a network energy consumption level, a maximum data rate, or both.

31. The method of claim 17, wherein the first control signaling is the same as the second control signaling.

32. The method of claim 17, wherein the first set of network operation modes, the second set of network operation modes, or both, comprise a first network energy saving mode, a second network energy saving mode, a flexible mode, a legacy mode, an inactive mode, or any combination thereof.

33. An apparatus for wireless communication at a user equipment (UE), comprising:
at least one processor; and
at least one memory coupled with the at least one processor, with instructions stored in the at least one memory, the instructions being executable by the at least one processor, individually or in any combination, to cause the apparatus to:
receive first control signaling indicating a first network operation sequence implemented by one or more network entities for performing communications via a first component carrier, the first network operation sequence comprising a first set of time intervals corresponding to a first set of network operation modes for the first component carrier;
receive second control signaling indicating a second network operation sequence implemented by the one or more network entities for performing communications via a second component carrier, the second network operation sequence different from the first network operation sequence, the second network operation sequence comprising a second set of time intervals corresponding to a second set of network operation modes for the second component carrier, the second set of time intervals and the second set of network operation modes different from the first set of time intervals and the first set of network operation modes, respectively;

communicate via the first component carrier in accordance with the first network operation sequence; and communicate via the second component carrier in accordance with the second network operation sequence.

34. An apparatus for wireless communication at a network entity, comprising:

at least one processor; and at least one memory coupled with the at least one processor, with instructions stored in the at least one memory, the instructions being executable by the at least one processor, individually or in any combination, to cause the apparatus to:

transmit, to a user equipment (UE), first control signaling indicating a first network operation sequence implemented by the network entity for performing communications via a first component carrier, the first network operation sequence comprising a first set of time intervals corresponding to a first set of network operation modes for the first component carrier;

transmit, to the UE, second control signaling indicating a second network operation sequence implemented by the network entity for performing communications via a second component carrier, the second network operation sequence different from the first network operation sequence, the second network operation sequence comprising a second set of time intervals corresponding to a second set of network operation modes for the second component carrier, the second set of time intervals and the second set of network operation modes different from the first set of time intervals and the first set of network operation modes, respectively;

communicate with the UE via the first component carrier in accordance with the first network operation sequence; and communicate with the UE via the second component carrier in accordance with the second network operation sequence.

* * * * *